US009084246B2

United States Patent
Lee et al.

(10) Patent No.: US 9,084,246 B2
(45) Date of Patent: Jul. 14, 2015

(54) METHOD FOR TRANSMITTING UPLINK CONTROL INFORMATION IN WIRELESS COMMUNICATION SYSTEM AND APPARATUS THEREFOR

(75) Inventors: Seungmin Lee, Anyang-si (KR); Hakseong Kim, Anyang-si (KR); Daewon Lee, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 193 days.

(21) Appl. No.: 13/976,360

(22) PCT Filed: Jan. 3, 2012

(86) PCT No.: PCT/KR2012/000029
§ 371 (c)(1),
(2), (4) Date: Jun. 26, 2013

(87) PCT Pub. No.: WO2012/093826
PCT Pub. Date: Jul. 12, 2012

(65) Prior Publication Data
US 2013/0272189 A1    Oct. 17, 2013

Related U.S. Application Data

(60) Provisional application No. 61/429,431, filed on Jan. 3, 2011.

(51) Int. Cl.
  H04W 72/04    (2009.01)
  H04B 7/155    (2006.01)
  H04L 5/00    (2006.01)
  H04L 27/26    (2006.01)

(52) U.S. Cl.
  CPC ........... *H04W 72/0413* (2013.01); *H04B 7/155* (2013.01); *H04L 5/0007* (2013.01); *H04L 5/0053* (2013.01); *H04L 27/2602* (2013.01); *H04L 5/0023* (2013.01)

(58) Field of Classification Search
  CPC .. H04B 7/155; H04L 27/2602; H04L 5/0007; H04L 5/0023; H04L 5/0053; H04W 2/0413
  USPC .................................................. 370/310, 315
  See application file for complete search history.

(56) References Cited

U.S. PATENT DOCUMENTS 8,599,782 B2 *  12/2013  Chung et al. ................... 370/329
2011/0317614 A1 *  12/2011  Park et al. ...................... 370/315

(Continued)

FOREIGN PATENT DOCUMENTS

CN           101141171       3/2008
KR      10-2010-0138852      12/2010

OTHER PUBLICATIONS

Catt, "Design of relay backhaul uplink control channels in LTE-A," 3GPP TSG RAN WG1 meeting #59bis, R1-100032, Jan. 2010, 3 pages.
Mitsubishi Electric, "Guard periods and timing for backhauling in Type 1 relays," 3GPP TSG RAN WG1 #60 meeting, R1-101457, Feb. 2010, 7 pages.
Mitsubishi Electric, "Guard periods and timing for DL backhauling in Type 1 relays," 3GPP TSG RAN WG1 #60bis meeting, R1-102239, Apr. 2010, 5 pages.
ZTE, "Remaining issues on Un Pucch," TSG-RAN WG1 #62b, R1-105448, Oct. 2010, 2 pages.

(Continued)

*Primary Examiner* — Chi H Pham
*Assistant Examiner* — Robert Lopata
(74) *Attorney, Agent, or Firm* — Lee, Hong, Degerman, Kang & Waimey

(57) ABSTRACT

The present invention relates to a method for allocating a resource which enables a relay node to transmit uplink control information to a base station in a wireless communication system. Specifically, the method for allocating the resource include the steps of: generating a control information sequence for a backhaul downlink sub-frame between a relay node and a base station; setting symbols for mapping the control information sequence when a plurality of symbols are punctured at a front end or a rear end of a backhaul uplink sub-frame between the relay node and the base station; and performing the time-first-mapping for the control information sequence with respect to resource elements corresponding to the set symbols in a descending order of sub-carrier indexes.

16 Claims, 28 Drawing Sheets

(56) References Cited

U.S. PATENT DOCUMENTS

| | | | |
|---|---|---|---|
| 2012/0014349 A1* | 1/2012 | Chung et al. | 370/329 |
| 2012/0033588 A1* | 2/2012 | Chung et al. | 370/280 |
| 2012/0069793 A1* | 3/2012 | Chung et al. | 370/315 |
| 2012/0127897 A1* | 5/2012 | Xu et al. | 370/279 |
| 2012/0134316 A1* | 5/2012 | Seo et al. | 370/315 |
| 2012/0163335 A1* | 6/2012 | Chung et al. | 370/330 |
| 2013/0010676 A1* | 1/2013 | Kim et al. | 370/315 |
| 2013/0195006 A1* | 8/2013 | Kim et al. | 370/315 |

OTHER PUBLICATIONS

Loa, et al., "IMT-Advanced Relay Standards," IEEE Communications Magazine, Aug. 2010, pp. 40-48.

PCT International Application No. PCT/KR2012/000029, Written Opinion of the International Searching Authority dated Jul. 31, 2012, 15 pages.

The State Intellectual Property Office of the People's Republic of China Application Serial No. 201280004618.4, Office Action dated May 6, 2015, 6 pages.

\* cited by examiner

FIG. 2
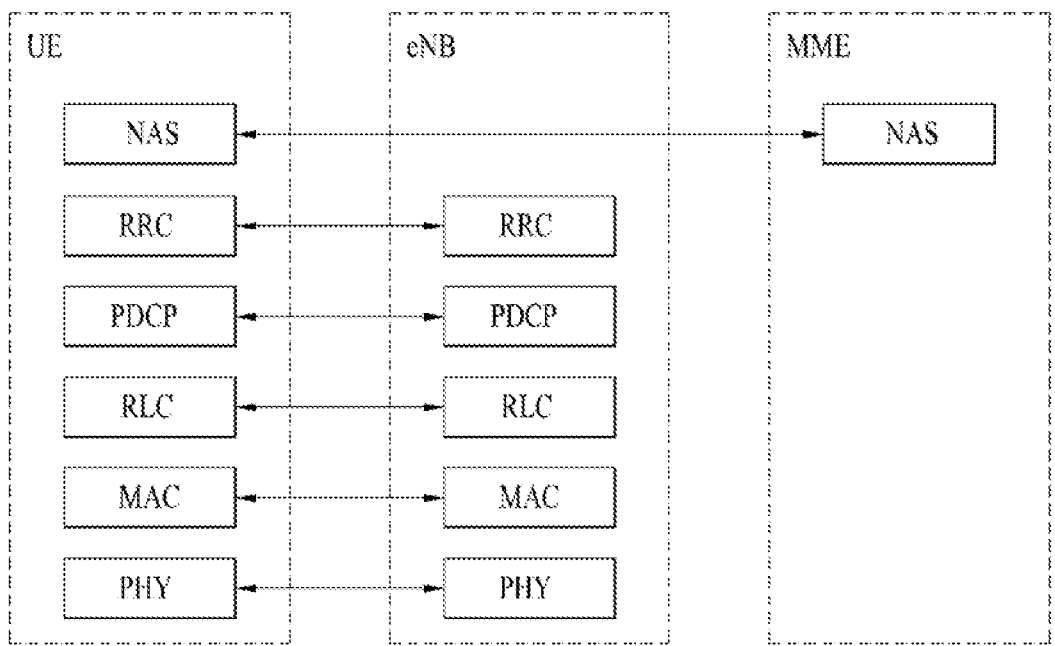
(a) control plane protocol stack
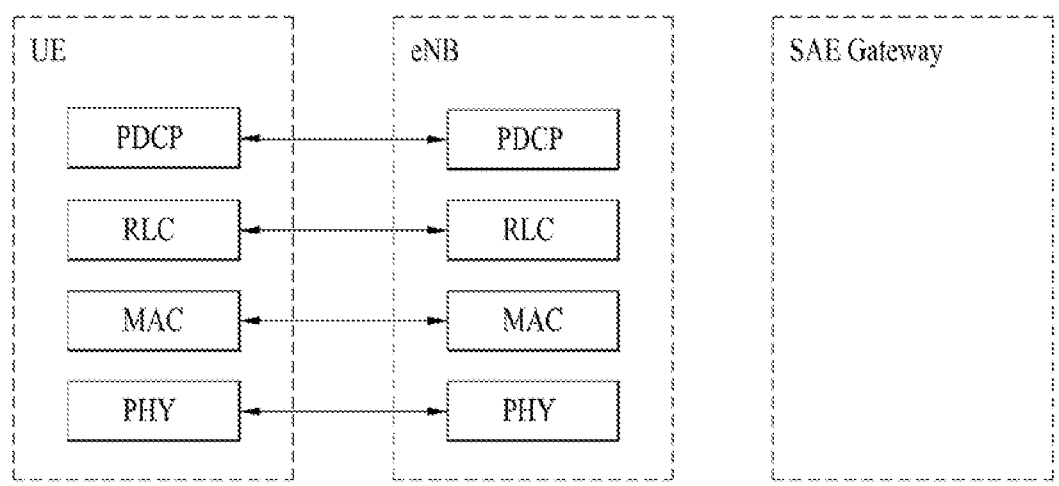
(b) user plane protocol stack

METHOD FOR TRANSMITTING UPLINK CONTROL INFORMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2012/000029, filed on Jan. 3, 2012, which claims the benefit of U.S. Provisional Application Ser. No. 61/429,431, filed on Jan. 3, 2011, the contents of which are all hereby incorporated by reference herein in their entirety.

TECHNICAL FIELD

The present invention relates to a wireless communication system, and more particularly, to a method of transmitting an uplink control information in a wireless communication system and apparatus therefor. Specifically, the present invention relates to a method of transmitting an uplink control information, which is transmitted by a relay node, to an eNode B and apparatus therefor or a method of transmitting an uplink control information, which is transmitted by a user equipment, to a relay node and apparatus therefor.

BACKGROUND ART

3GPP LTE (3$^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3$^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of transmitting UL control information in a wireless communication system and apparatus therefor in the following description based on the discussion mentioned in the foregoing description.

Technical Solution

To achieve these and other advantages and in accordance with the purpose of the present invention, as embodied and broadly described, according to one embodiment of the present invention a method of allocating a resource, which is allocated by a relay node to transmit an uplink control information to an eNode B in a wireless communication system, includes the steps of generating a control information sequence for a backhaul downlink between the relay node and the eNode B, if a plurality of symbols are punctured in a front end or a rear end of a backhaul uplink subframe between the relay node and the eNode B, setting symbols for mapping the control information sequence, and performing a time-first mapping for the control information sequence to resource elements corresponding to the set symbols in descending order of a subcarrier index.

Meanwhile, to further achieve these and other advantages and in accordance with the purpose of the present invention, according to a different embodiment a relay node in a wireless communication system includes a processor configured to generate a control information sequence for a backhaul downlink between the relay node and an eNode B, if a plurality of symbols are punctured in a front end or a rear end of a backhaul uplink subframe between the relay node and the eNode B, the processor configured to set symbols for mapping the control information sequence, the processor configured to perform a time-first mapping for the control information sequence to resource elements corresponding to the set symbols in descending order of a subcarrier index, and a transmission module configured to transmit the mapped control information sequence to the eNode B.

In case that a control information on the backhaul downlink corresponds to a rank indicator, if a plurality of the symbols are punctured in the rear end of the backhaul uplink subframe to which a normal cyclic prefix is applied, the symbols for mapping the control information sequence are set to an index 5 and 8. Or, the symbols for mapping the control information sequence are set to an index 1, 5, and 8.

Moreover, if a plurality of the symbols are punctured in the front end of the backhaul uplink subframe to which a normal cyclic prefix is applied, the symbols for mapping the control information sequence are set to an index 5, 8, and 12.

In case that a control information on the backhaul downlink corresponds to an ACK/NACK (Acknowledgement/Negative ACK) information, if a plurality of the symbols are punctured in the front end of the backhaul uplink subframe to which an extended cyclic prefix is applied, the symbols for mapping the control information sequence are set to an index 3 and 7. Or, the symbols for mapping the control information sequence are set to an index 3, 7, and 9.

Advantageous Effects

According to embodiments of the present invention, a relay node may be able to effectively transmit UL control information to an eNode B. Or, a user equipment may be able to effectively transmit UL control information to a relay node in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

BEST MODE

Mode for Invention

Figure 1:
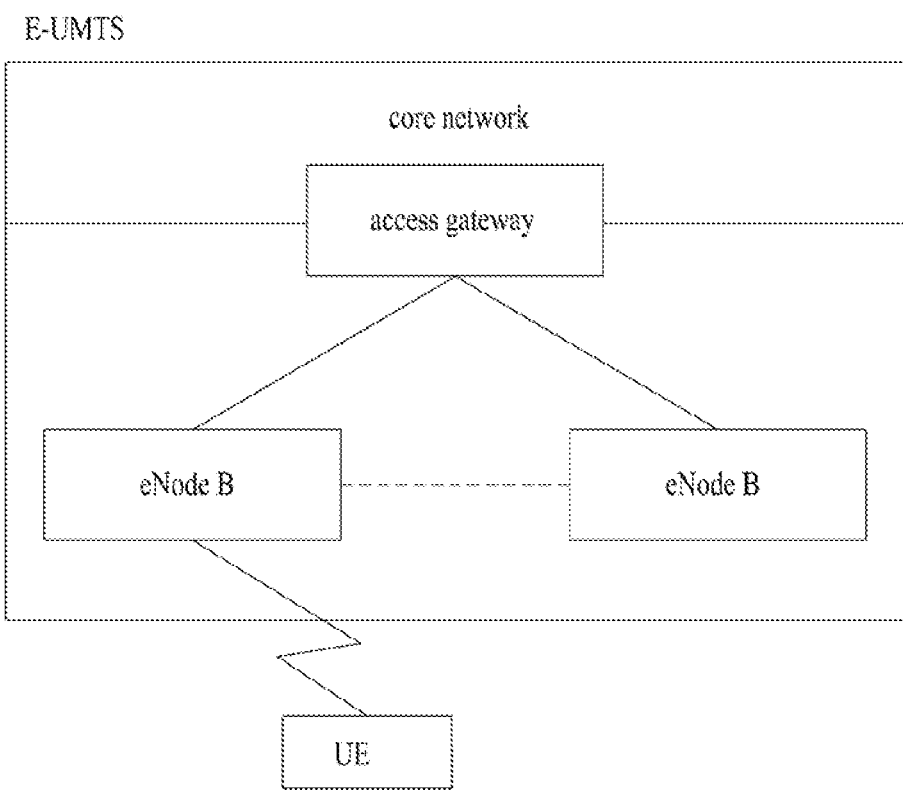
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention can be applied to H-FDD or TDD in a manner of being easily modified.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
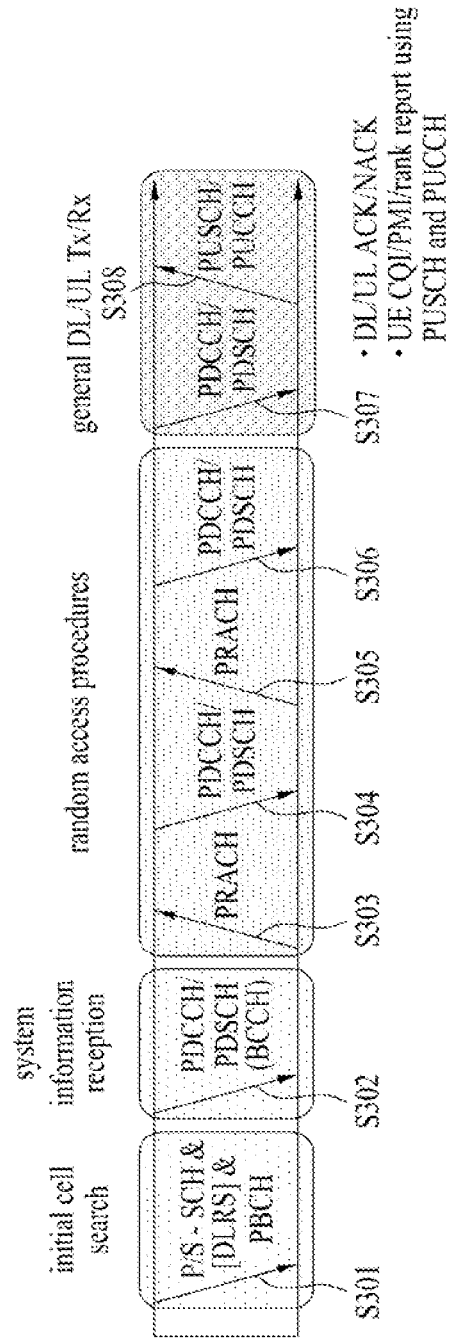
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
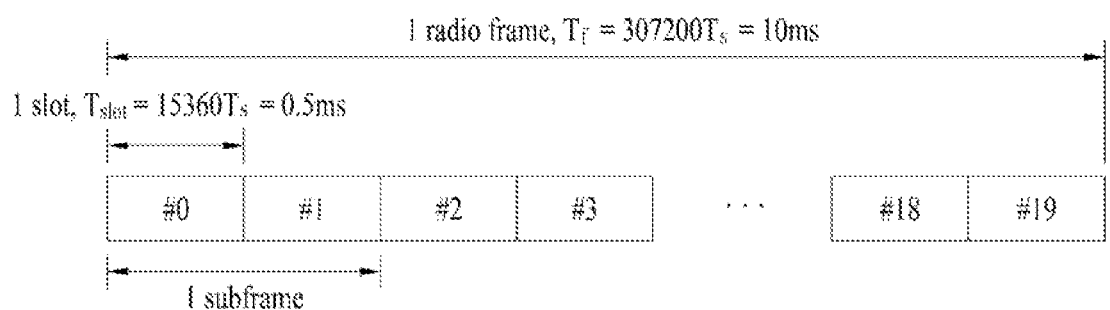
FIG. 4 is a diagram for a structure of a radio frame in LTE system.

FIG. 4 is a diagram for a structure of a radio frame used in an LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_s$ indicates a sampling time and is represented as $T_s = 1/(15 \text{ kHz} \times 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
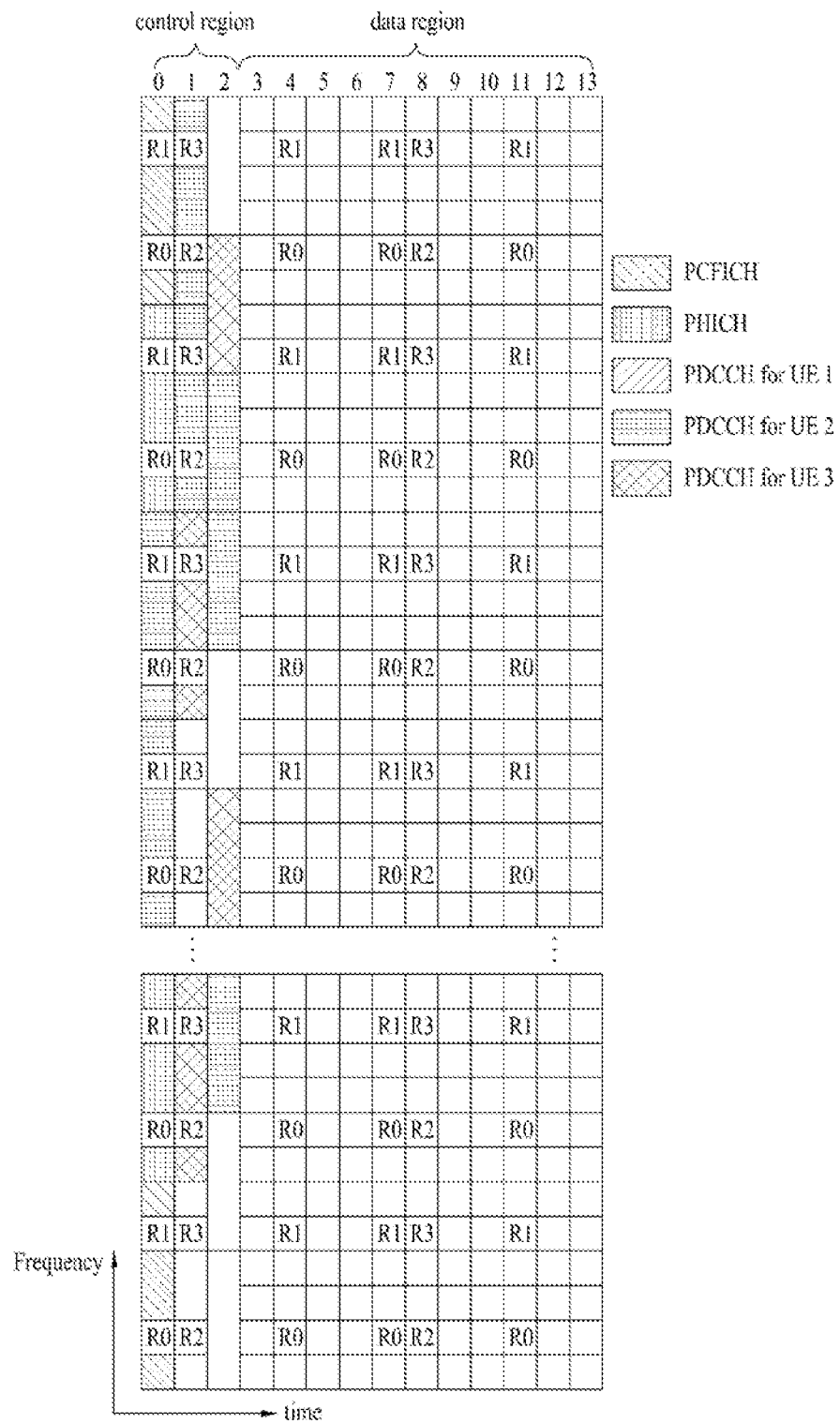
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
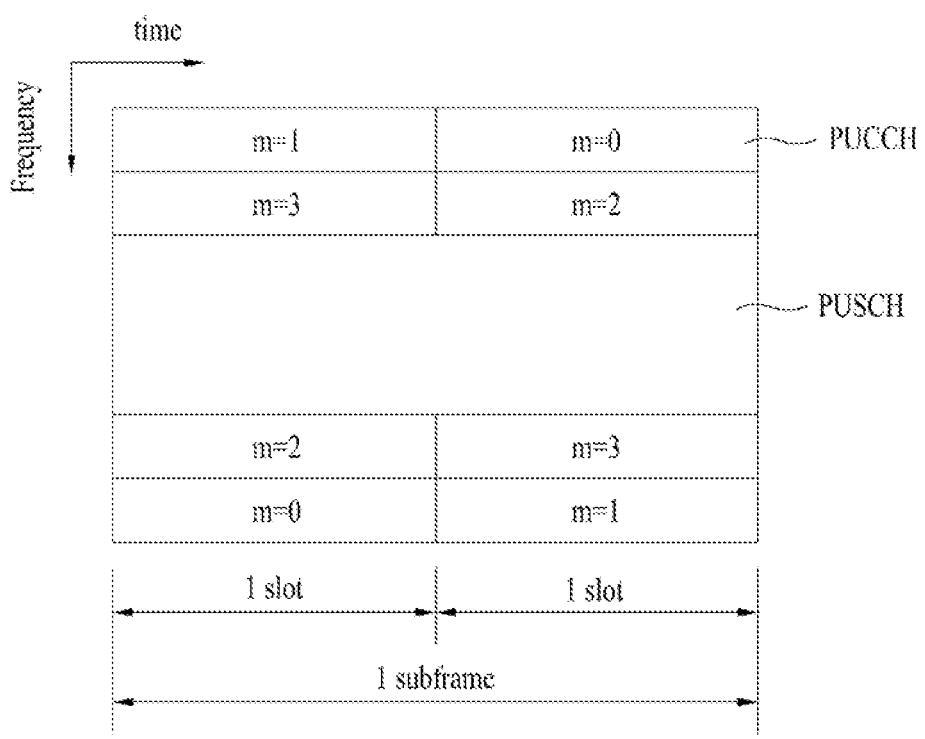
FIG. 6 is a diagram for a structure of an uplink subframe used in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource request, and the like. The PUCCH for a single UE uses one resource block, which occupies different frequencies in each slot within a subframe. In particular, 2 resource blocks assigned to the PUCCH are frequency hopped on a slot boundary. In particular, FIG. 6 shows an example that the PUCCH satisfying conditions (e.g., m=0, 1, 2, 3) is assigned to a subframe.

Meanwhile, In case that a channel status between an eNode B and a user equipment is poor, a relay node (RN) is installed between the eNode B and the user equipment, thereby providing the user equipment with a radio channel having a better channel status. Moreover, by introducing a relay node into a cell edge area having a poor channel status from an eNode B, if the relay node is used, it may provide a faster data channel and extend a cell service area. Thus, a relay node is the technology introduced to solve the propagation shadow zone problem of a wireless communication system and is widely used.

Compared to a conventional relay node having a function limited to a function of a repeater configured to simply amplify and transmit a signal, a recent relay node is evolved into a further-intelligent form. Moreover, the relay node technology corresponds to the technology essential to service coverage extension and data throughput improvement as well as cost reductions for base station expansion and backhaul network maintenance in a next generation mobile communication system. To keep up with the ongoing development of the relay node technology, it is necessary for a new wireless communication system to support a relay node used by the related art wireless communication system.

Figure 7:
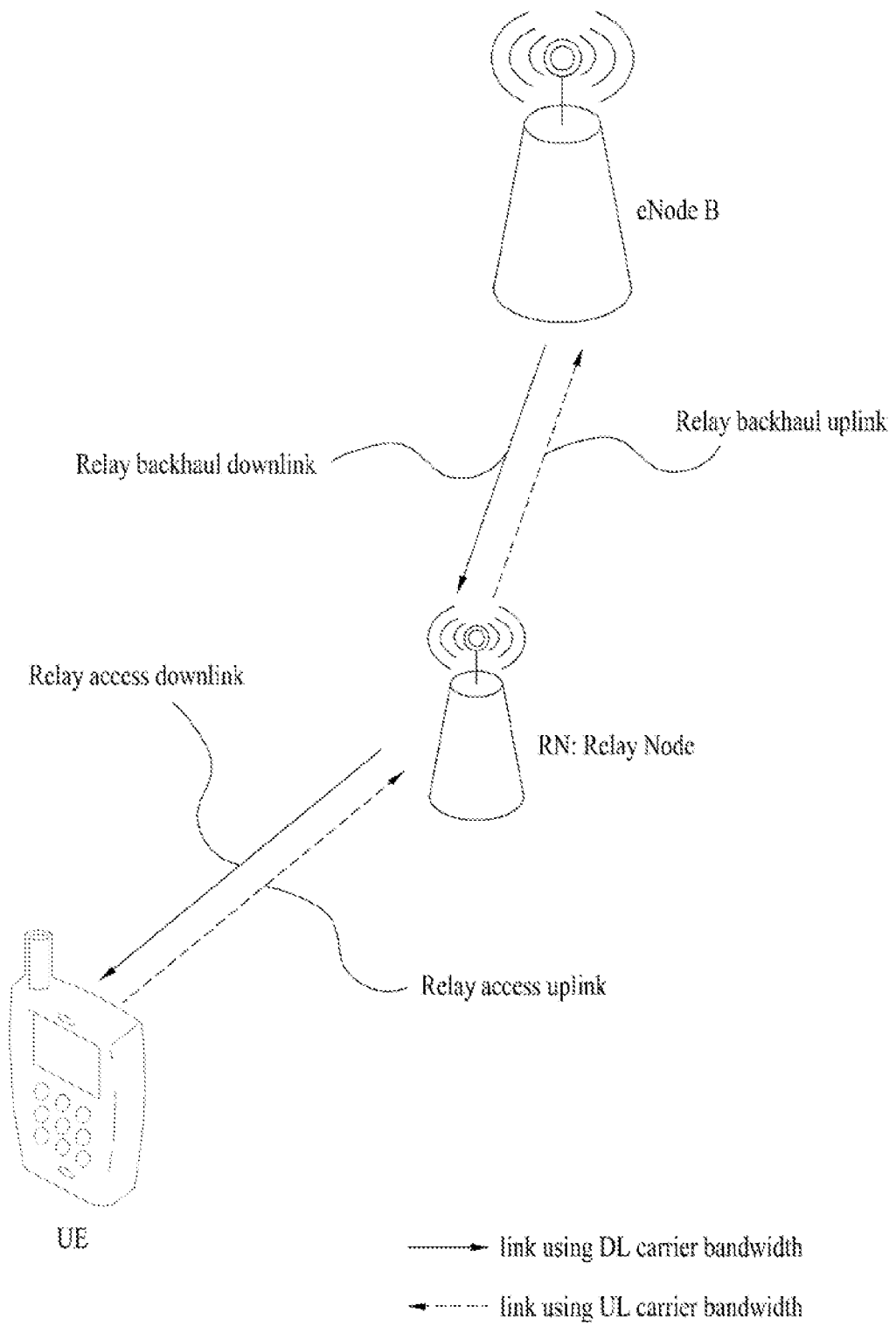
FIG. 7 is a diagram for a configuration of a relay backhaul link and a relay access link in a wireless communication system.

FIG. 7 is a diagram for a configuration of a relay backhaul link and a relay access link in a wireless communication system.

Referring to FIG. 7, as a relay node is introduced to play a role of forwarding a linkage between a eNode B and a user equipment, links of two types differing from each other in attribute are applied to a UL carrier frequency band and a DL carrier frequency band, respectively. A connecting link part established between an eNode B and a relay node is represented in a manner of being defined as a relay backhaul link.

If transmission is performed using a DL frequency band (frequency division duplex, in case of FDD) or DL subframe (time division duplex, in case of TDD) resource, it may be represented as a backhaul downlink. If transmission is performed using a UL frequency band (in case of FDD) or UL subframe (in case of TDD) resource, it may be represented as a backhaul uplink.

On the other hand, a connection link part established between relay node and user equipment is represented in a manner of being defined as a relay access link. If transmission is performed via a relay access link using a DL frequency band (in case of FDD) or a resource of a DL subframe (in case of TDD), it may be represented as an access downlink. If transmission is performed via a relay access link using a UL frequency band (in case of FDD) or a resource of a UL subframe (in case of TDD), it may be represented as an access uplink.

A relay node (RN) may receive information from an eNode B in relay backhaul downlink or transmit information to the eNode B in relay backhaul uplink. The relay node may transmit information to a user equipment in relay access downlink or receive information from the user equipment in relay access uplink.

Meanwhile, regarding a band (or spectrum) use of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter, a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment is communicating with a network through a relay node. And, the 'non-transparent' may mean a case that a user equipment is able to recognize whether the user equipment is communicating with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identity (ID), the relay node does not have a cell identity of its own. If at least one portion of RRM (Radio Resource Management) is controlled by an eNode B having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relay nodes, a variety of L2 ($2^{nd}$ layer) relay nodes, and type-2 relay nodes may belong to the category of the above-mentioned relay node.

Regarding a relay node configured to control a cell by itself, this relay node controls one or more cells, a unique physical layer cell identity is provided to each cell controlled by the relay node, and the same RRM mechanism may be usable. In aspect of a user equipment, there is no difference between accessing a cell controlled by a relay node and accessing a cell controlled by a general eNode B. Preferably, a cell controlled by the above-mentioned relay node may be able to support a legacy user equipment. For example, a self-backhauling RN, an L3 (3rd layer) relay node, a type-1 relay node, and a type-1a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and may be able to transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy eNode B (e.g., an eNode B operating in the LTE Release-8 system). In particular, the type-1 relay node has backward compatibility. Meanwhile, in aspect of user equipments operating in LTE-A system, the type-1 relay node is considered as an eNode B different from a legacy eNode B, whereby performance thereof can be enhanced.

The type-1a relay node is operated in the out-band, and has the same features as those of the type-1 relay node. Operation of the type-1a relay node may be configured to minimize (or eliminate) the influence on L1 ($1^{st}$ layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, In order for a relay node to operate in in-band, prescribed resources in time-frequency space must be reserved for a backhaul link and these resources may be configured not be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission is performed on a downlink frequency band, and a backhaul uplink transmission is performed on an uplink frequency band. Regarding the backhaul link multiplexing by TDM, a backhaul downlink transmission is performed in a downlink subframe of an eNode B or a relay node, and a backhaul uplink transmission is performed in an uplink subframe of the eNode B or the relay node.

In case of an in-band relay node, for example, provided that both a backhaul downlink reception from a eNode B and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if access uplink receptions from a user equipment and a backhaul uplink transmission to an eNode B are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on/under the ground).

As a solution for the above signal interference problem, it may be able to enable a relay node not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 8:
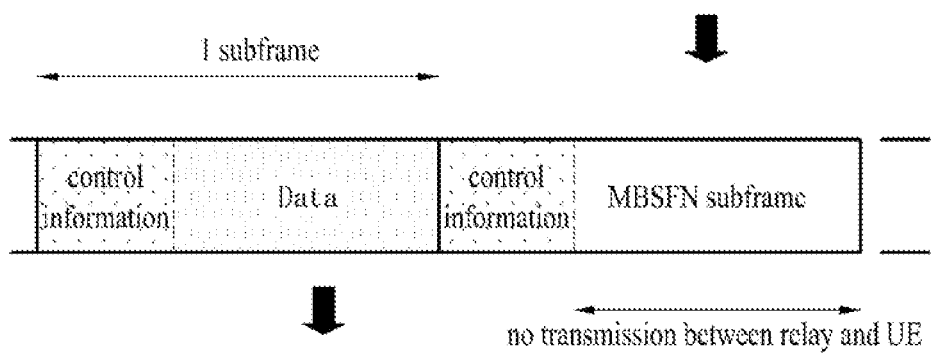
FIG. 8 is a diagram for showing an example of a relay node resource partitioning.

FIG. 8 is a diagram for showing an example of a relay node resource partitioning.

Referring to FIG. 8, a $1^{st}$ subframe corresponds to a normal subframe and a downlink (i.e., an access down link) control signal and data are transmitted from a relay node to a user equipment. A $2^{nd}$ subframe corresponds to an MBSFN subframe. The control signal is transmitted from the relay node to the user equipment in a control region of the DL subframe. Yet, no transmission is performed from the relay node to the user equipment in the rest of the region of the DL subframe. In this case, since a legacy user equipment is configured to expect a transmission of a physical downlink control channel (PDCCH) in all DL subframes (i.e., since it is necessary for the relay node to support the legacy user equipments within the region of the relay node to perform a measuring function in a manner of receiving the PDCCH on every subframe), it is necessary to transmit the PDCCH in all DL subframes for a correct operation of the legacy user equipment. Hence, even in the subframe configured for the downlink (i.e., backhaul downlink) transmission from the eNode B to the relay node, it is necessary for the relay node not to receive a backhaul downlink but to perform an access downlink transmission in the first N (N is 1, 2, or 3) number of OFDM symbol interval of the subframe. Regarding this, since the PDCCH is transmitted from the relay node to the user equipment in the control region of the 2nd subframe, backward compatibility for the legacy user equipment serving in the relay node may be provided. In the rest of the region of the $2^{nd}$ subframe, the relay node may be able to receive a transmission from the eNode B while no transmission is performed from the relay node to the user equipment. Therefore, by using the resource partitioning, it may enable not to perform the access downlink transmission and the backhaul downlink reception at the same time in an in-band relay node.

The $2^{nd}$ subframe using an MBSFN subframe is explained in detail. A control region of the $2^{nd}$ subframe may be called a relay node non-hearing interval. The relay node non-hearing interval means an interval for the relay node to transmit an access downlink signal without receiving a backhaul downlink signal. This interval can be configured by the length of 1, 2, or 3 OFDMs. The relay node performs an access downlink transmission to a user equipment in the relay node non-hearing interval and may be able to receive a backhaul downlink from an eNode B in the rest of the region. At this time, since the relay node is unable to perform a transmission and reception at the same time on an identical frequency band, it takes time for the relay node to change from a transmitting mode to a receiving mode. Thus, it is necessary to configure a guard time (GT) in order for the relay node to switch from the receiving mode to the transmitting mode in a first prescribed part of the interval of the backhaul downlink receiving region. Similarly, in case that the relay node operates to receive the backhaul link from the eNode B and to transmit the access downlink to the user equipment, it may be able to configure the guard time (GT) in order for the relay node to switch from the receiving mode to the transmitting mode. The length of the guard time may be given by the value of the time domain. For instance, it may be given by the value of k (k≥1) number of time sample (Ts) or may be configured by the length of one or more OFDM symbols. Or, the guard time of the last part of the subframe may not be defined or configured in case that the relay node backhaul downlink subframe is configured consecutively or according to a prescribed subframe timing alignment relationship. In order to maintain a backward compatibility, the guard time can be defined on the frequency domain configured for the backhaul downlink subframe transmission only (if the guard time is configured in the access downlink interval, a legacy user equipment may not be supported). The relay node may be able to receive PDCCH and PDSCH in the backhaul downlink receiving interval except the guard time. This may be represented as an R-PDCCH (relay-PDCCH) and an R-PDSCH (relay-PDSCH) in a meaning of a relay node dedicated physical channel.

Figure 9:
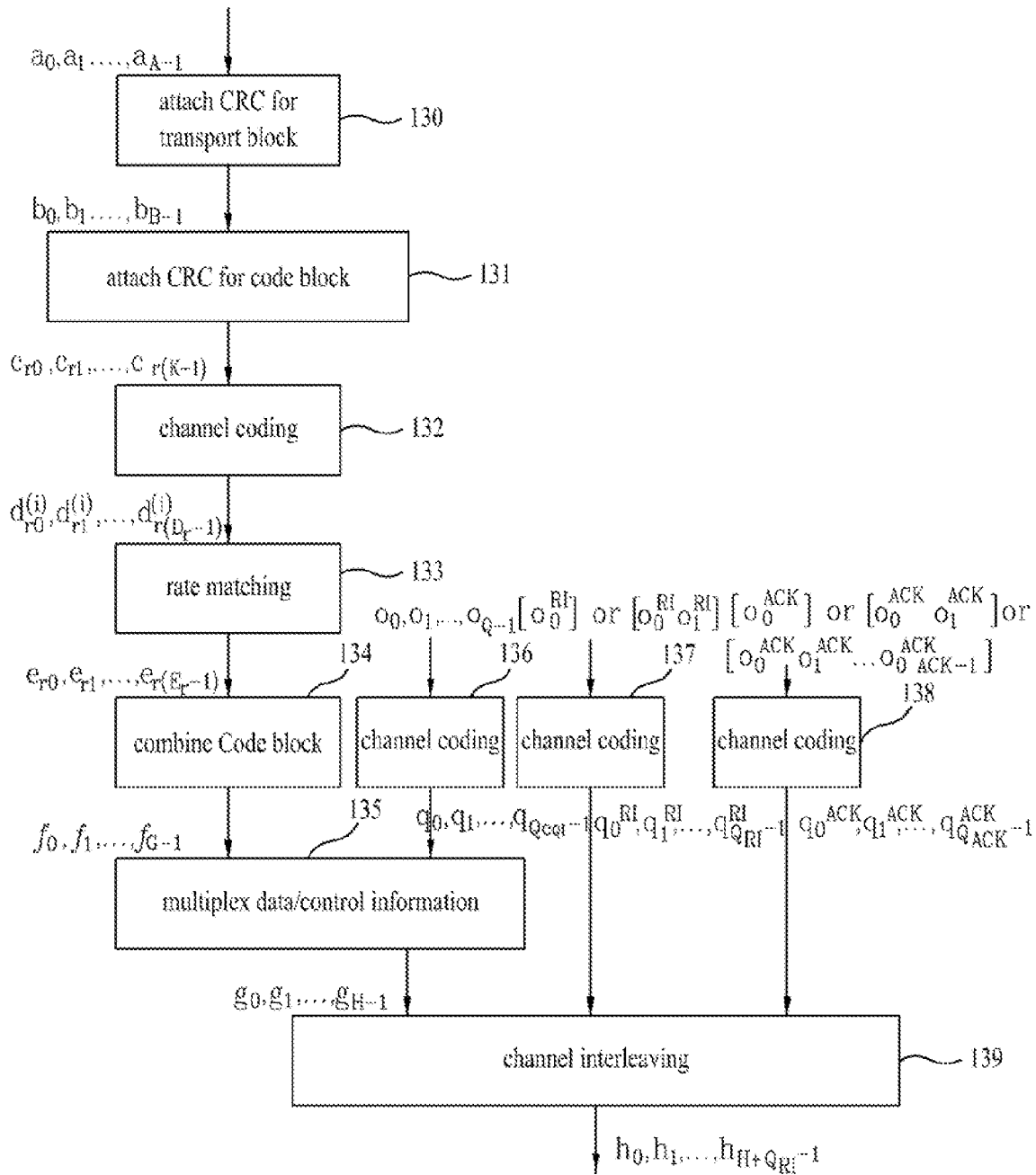
FIG. 9 is a block diagram for explaining a process of a physical uplink shared channel.

Meanwhile, explanation on a processing structure of a physical uplink shared channel (PUSCH) is as follows. FIG. 9 is a block diagram for explaining a process of a physical uplink shared channel. As shown in the FIG. 9, data information multiplexed together with control information is transmitted in a following manner. First of all, CRC (cyclic redundancy check) for TB (transport block) is attached to a transport block (hereinafter abbreviated TB), which should be transmitted in UL [S130], the information is divided into a plurality of code blocks (hereinafter abbreviated CB) according to a size of the TB, and CRC for the CB is attached to a plurality of the CBs [S131]. According to a result value of the aforementioned process, a channel coding is performed [S132]. Moreover, after a channel coded data goes through a rate matching [S133], a combination between the CBs is performed again [S134]. These combined CBs are multiplexed with CQI/PMI (channel quality information/precoding matrix index) [S135].

Meanwhile, a channel coding on the CQI/PMI is performed on the sidelines of the data [S136]. The channel coded CQI/PMI is multiplexed with the data [S135].

And, a channel coding on an RI (rank indication) is performed on the sidelines of the data as well [S137].

In case of ACK/NACK (acknowledgement/negative acknowledgement), a channel coding is performed on the sidelines of the data, CQI, PMI and RI [S138]. An output signal is generated in a manner of interleaving the multiplexed data, the CQI/PMI, the separately channel coded RI and ACK/NACK [S139].

Meanwhile, a physical resource element (hereinafter abbreviated RE) for data and control channel in an LTE UL system is explained in the following description.

Figure 10:
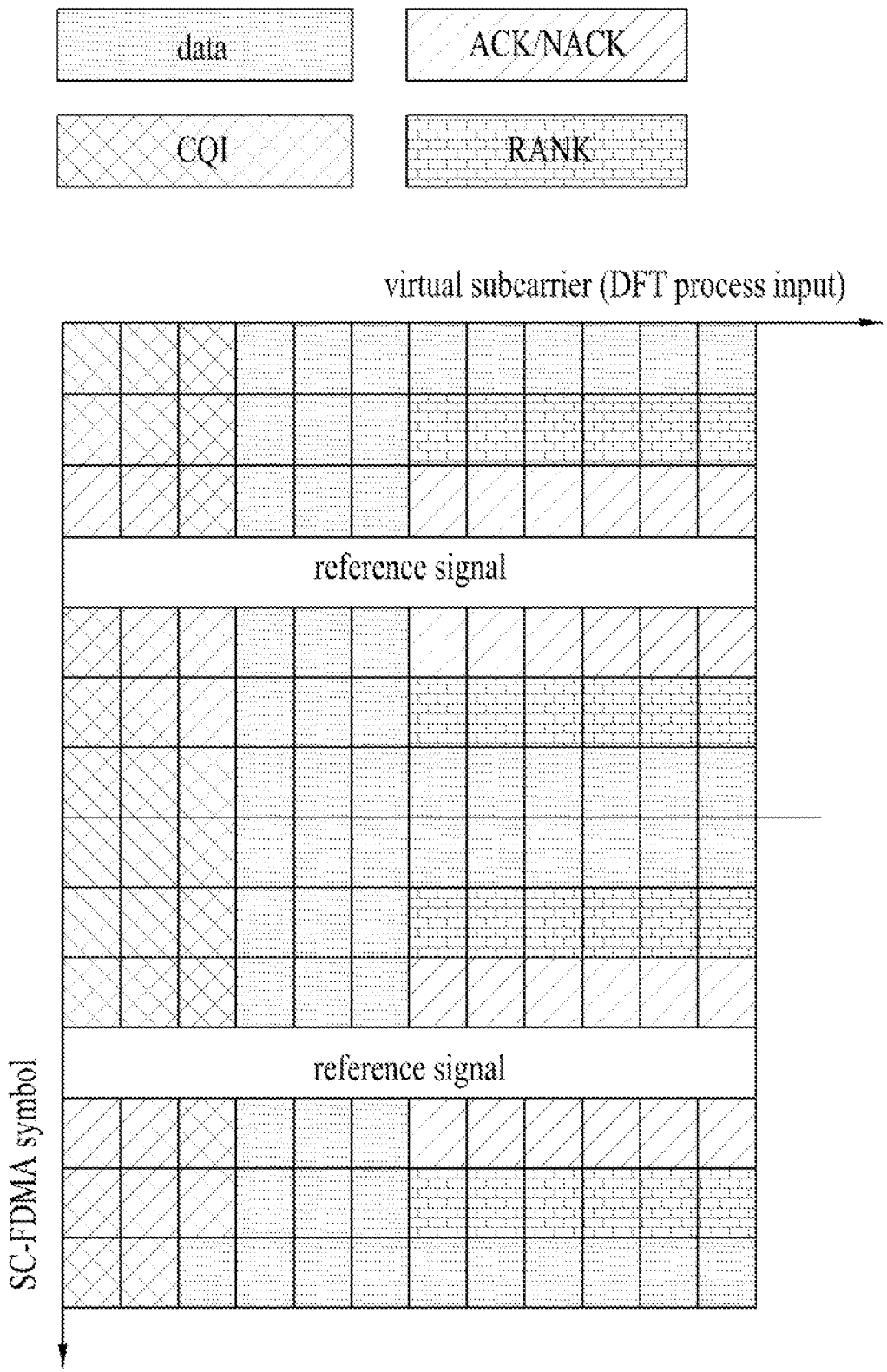
FIG. 10 is a diagram for explaining a method of mapping a physical resource to transmit an uplink data and a control channel.

FIG. 10 is a diagram for explaining a method of mapping a physical resource to transmit an uplink data and a control channel.

Referring to FIG. 10, CQI/PMI and the data are mapped to an RE by a time-first scheme. An encoded ACK/NACK is inserted in the vicinity of a demodulation reference signal (DM RS) in a manner of being punctured. And, an RI is mapped to an RE next to the RE at which the ACK/NACK is situated. The resource for the RI and the ACK/NACK may be able to occupy maximum 4 SC-FDMA symbols. In case that data and control information are transmitted to an UL shared channel at the same time, a mapping is performed in the following order; RI, concatenation of CQI/PMI and data, and ACK/NACK. In particular, the RI is mapped first and then the concatenation of CQI/PMI and data is mapped to the rest of REs except the RE to which the RI is mapped by the time-first scheme. The ACK/NACK is mapped in a manner of puncturing the concatenation of CQI/PMI and data, which is already mapped.

As mentioned in the foregoing description, by multiplexing an uplink control information (UCI) such as CQI/PMI and the like, a single carrier property can be satisfied. Hence, an uplink transmission maintaining a low CM (cubic metric) can be achieved.

In a system (e.g., LTE Rel-10) by which a legacy system is enhanced, at least one transmission scheme of a SC-FDMA and a clustered DFTs OFDMA can be applied to each user equipment on each of component carriers to perform a UL transmission and can be applied together with an UL-MIMO (uplink-MIMO).

Figure 11:
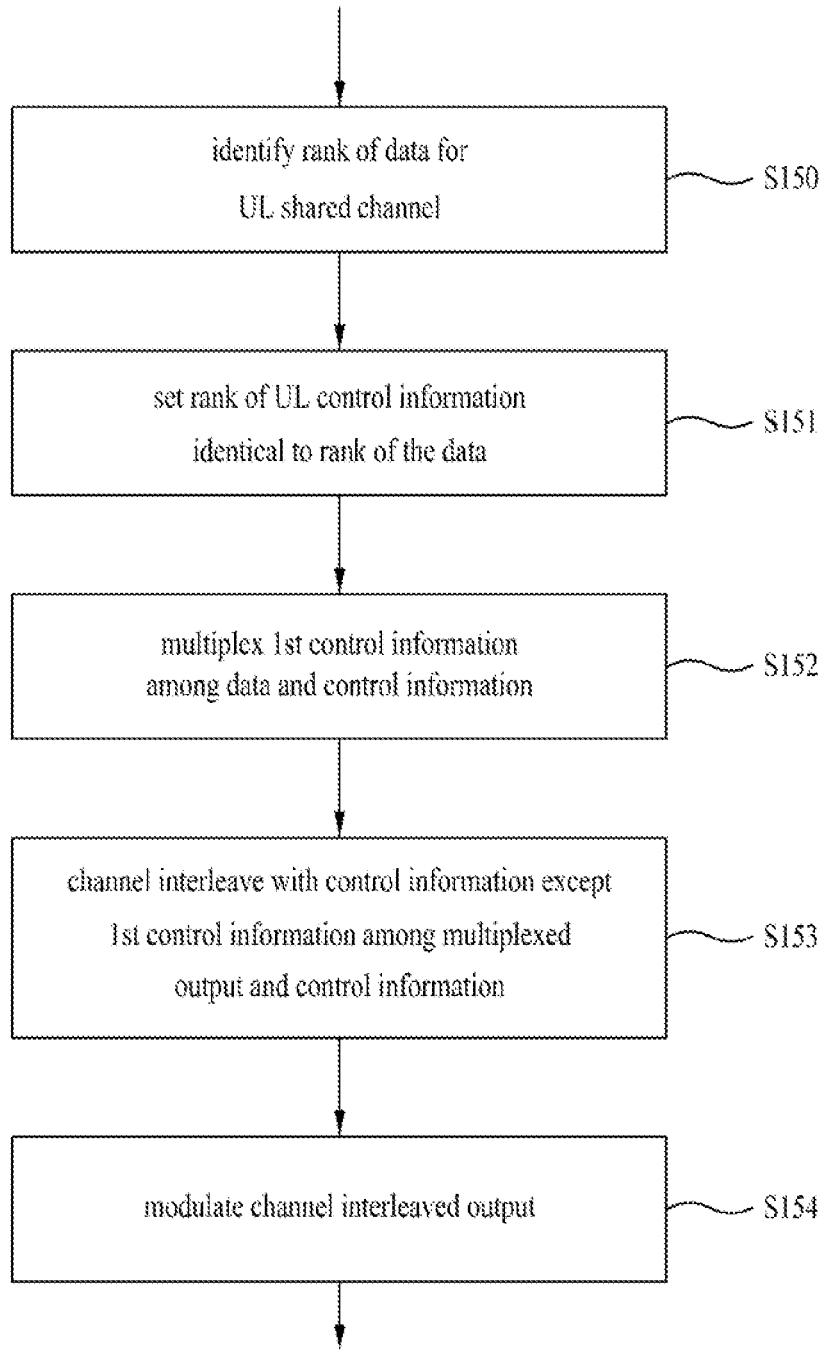
FIG. 11 is a flowchart for explaining a method of efficiently multiplexing a data and a control channel on an uplink shared channel.

FIG. 11 is a flowchart for explaining a method of efficiently multiplexing a data and a control channel on an uplink shared channel.

Referring to FIG. 11, a user equipment identifies a rank for a data of physical uplink shared channel (PUSCH) [S150]. And then, the user equipment sets a rank for an uplink control channel (in this case, the control channel means such an uplink control information (UCI) as CQI, ACK/NACK, RI and the like) with an identical rank, which is the same rank set to the data [S151]. And, the user equipment multiplexes the data and the control information, i.e., the CQI in a manner of being concatenated [S152]. And then, after the RI is mapped into a designated RE and the concatenated data and the CQI are mapped by the time-first scheme, a channel interleaving can be performed to help the ACK/NACK to be mapped in a manner of puncturing an RE situated in the vicinity of a DM-RS [S153].

Thereafter, the data and the control channel can be modulated to QPSK, 16QAM, 64QAM and the like according to an MCS table [S154]. In this case, the modulating step may move to a different position (for instance, the modulation block can be moved to a previous step of the multiplexing step of the data and the control channel). And, the channel interleaving can be performed by either a codeword unit or a layer unit.

Figure 12:
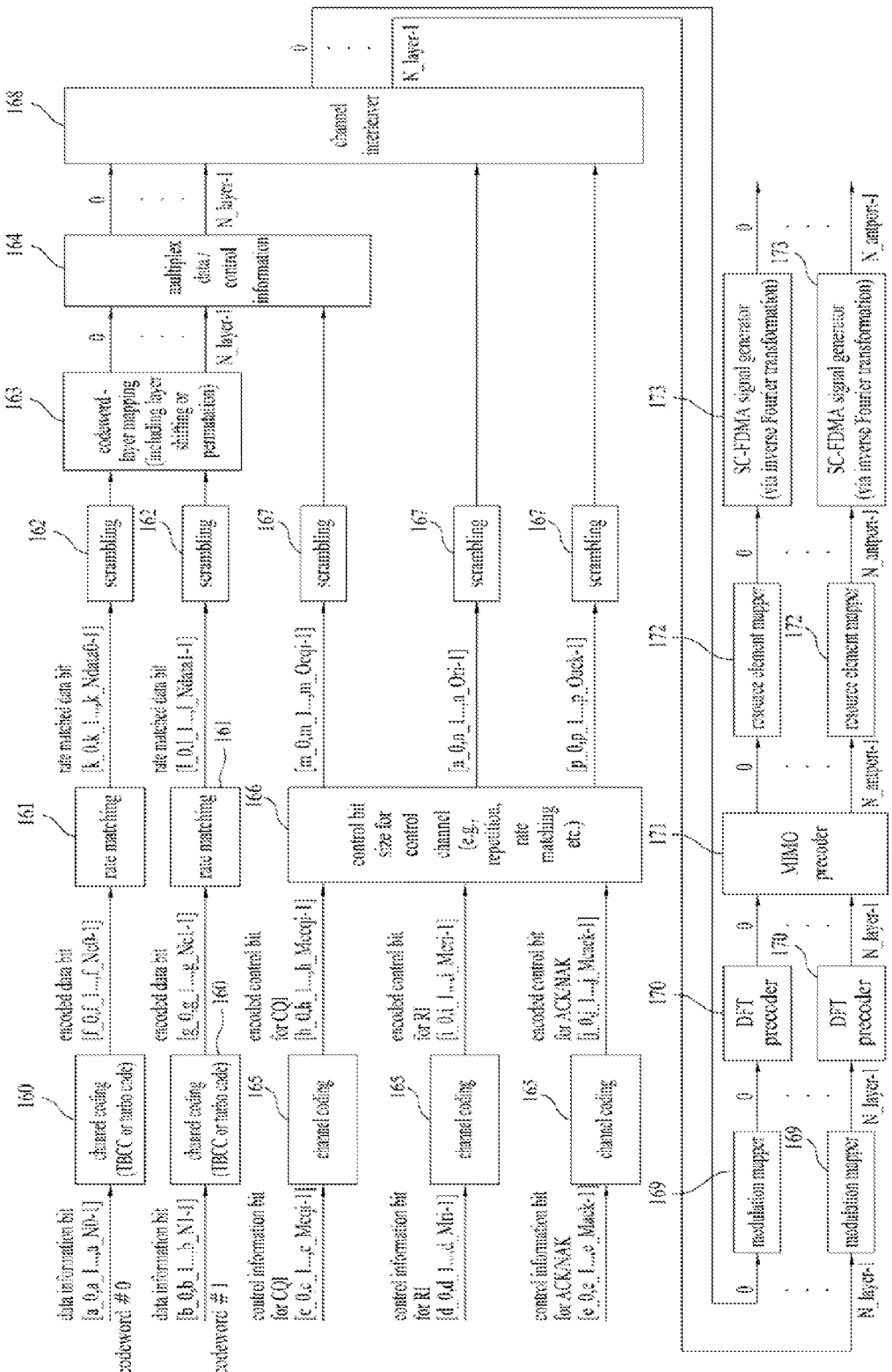
FIG. 12 is a block diagram for explaining a method of generating a transmission signal of a data and a control channel.

FIG. 12 is a block diagram for explaining a method of generating a transmission signal of a data and a control channel. The position of each block is able to change according to a scheme to which applied thereto.

Assume that there are two code words. A channel coding is performed according to each of the code words [S160]. A rate matching is performed according to a given MCS level and a size of a resource [S161]. And, encoded bits can be scrambled by cell-specifically, UE-specifically, or codeword-specifically [S162].

Thereafter, a codeword to layer mapping is performed [S163]. In this process, an operation of a layer shift or a permutation can be included.

Figure 13:
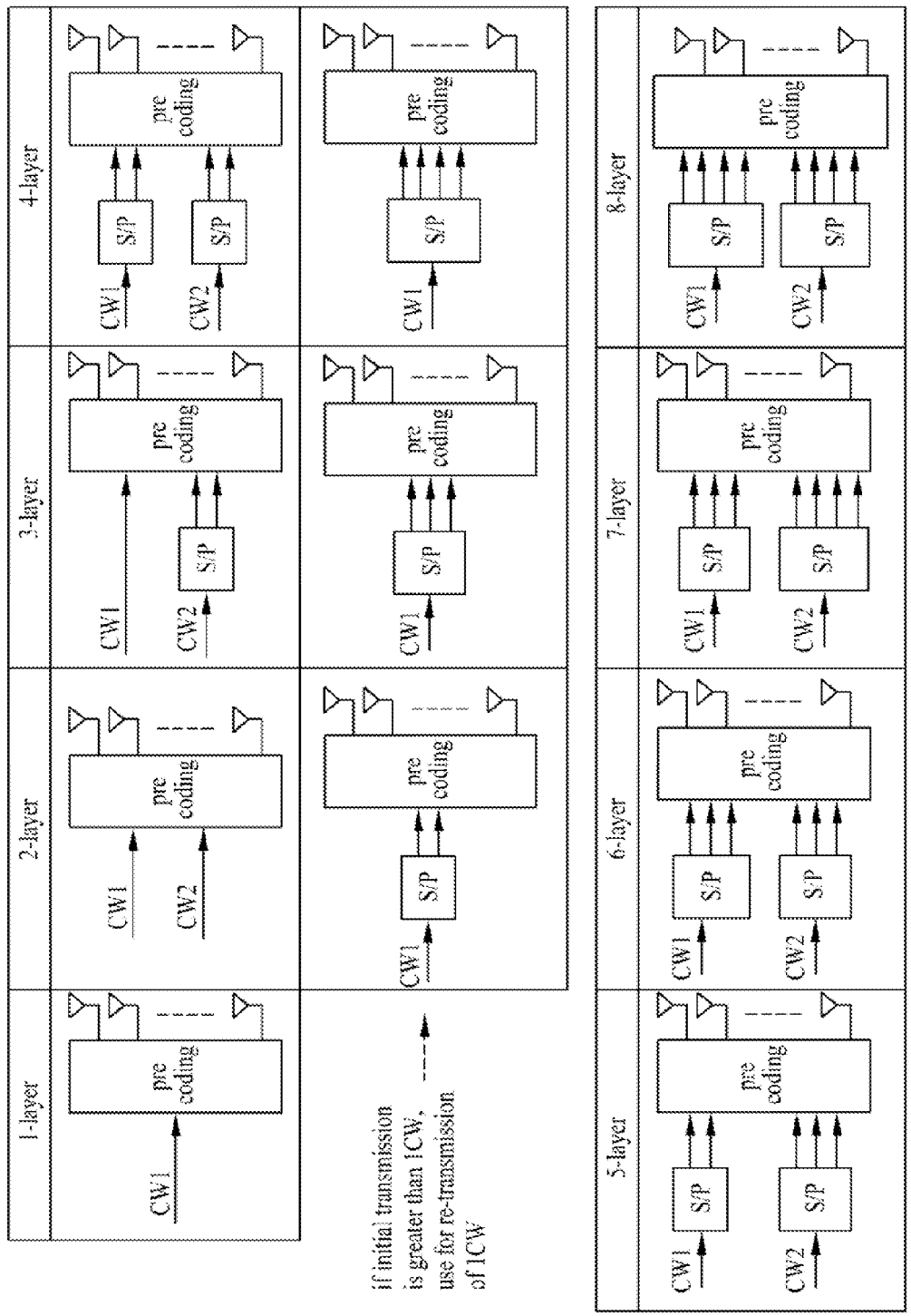
FIG. 13 is a diagram for explaining a method of mapping a codeword to a layer.

FIG. 13 is a diagram for explaining a method of mapping a codeword to a layer. The codeword to layer mapping can be performed using a rule depicted in FIG. 13.

Such control information as CQI, RI, and ACK/NACK is channel-coded according to a provided specification [S165]. In this case, the CQI, the RI, and the ACK/NACK can be coded using an identical channel code for all code words or can be coded using a different channel code according to a codeword.

And then, the number of encoded bit can be modified by a bit size control unit [S166]. The bit size control unit can be unified with a channel coding block [S165]. A signal outputted from the bit size control unit is scrambled [S167]. In this case, the scrambling can be performed by cell-specifically, layer-specifically, codeword-specifically, or UE-specifically.

The bit size control unit can operate as follows.

(1) The control unit identifies a rank (n_rank_pusch) of data for a PUSCH.

(2) A rank of a control channel (n_rank_control) is set to be identical to the rank of data (i.e., n_rank_control=n_rank_pusch), the number of bit for the control channel (n_bit_ctrl) expands its bit number in a manner of being multiplied by the rank of the control channel.

One method of performing this is to simply copy the control channel and repeat. In this case, the control channel may be an information level prior to a channel coding or may be a coded bit level after the channel coding. In particular, for instance, in case of a control channel [a0, a1, a2, a3], which is n_bit_ctrl=4 and the n_rank_pusch=2, an expanded bit number (n_ext_ctrl) may correspond to [a0, a1, a2, a3, a0, a1, a2, a3], which is 8 bits.

In case that the bit size control unit and a channel coding unit are configured to one unit, a coded bit can be generated in a manner of applying a channel coding defined by a legacy system (e.g., LTE Rel-8) and a rate matching.

In addition to the bit size control unit, a bit level interleaving can be performed to more randomize according to layers. Or, an interleaving can be performed in a modulated symbol level in order to provide an equivalent effect.

A CQI/PMI channel and data for 2 code words can be multiplexed by a data/control information multiplexer [S164]. And then, ACK/NACK information is mapped to both slots within a subframe in a manner of being mapped to the RE situated in the vicinity of UL DM-RS and a channel interleaver maps the CQI/PMI according to the time-first scheme [S168].

And, a modulation is performed according to each layer [S169], a DFT precoding [S170], a MIMO precoding [S171], an RE mapping [S172] and the like are sequentially performed. And, a SC-FDMA signal is then generated and transmitted via an antenna port [S173].

Figure 16:
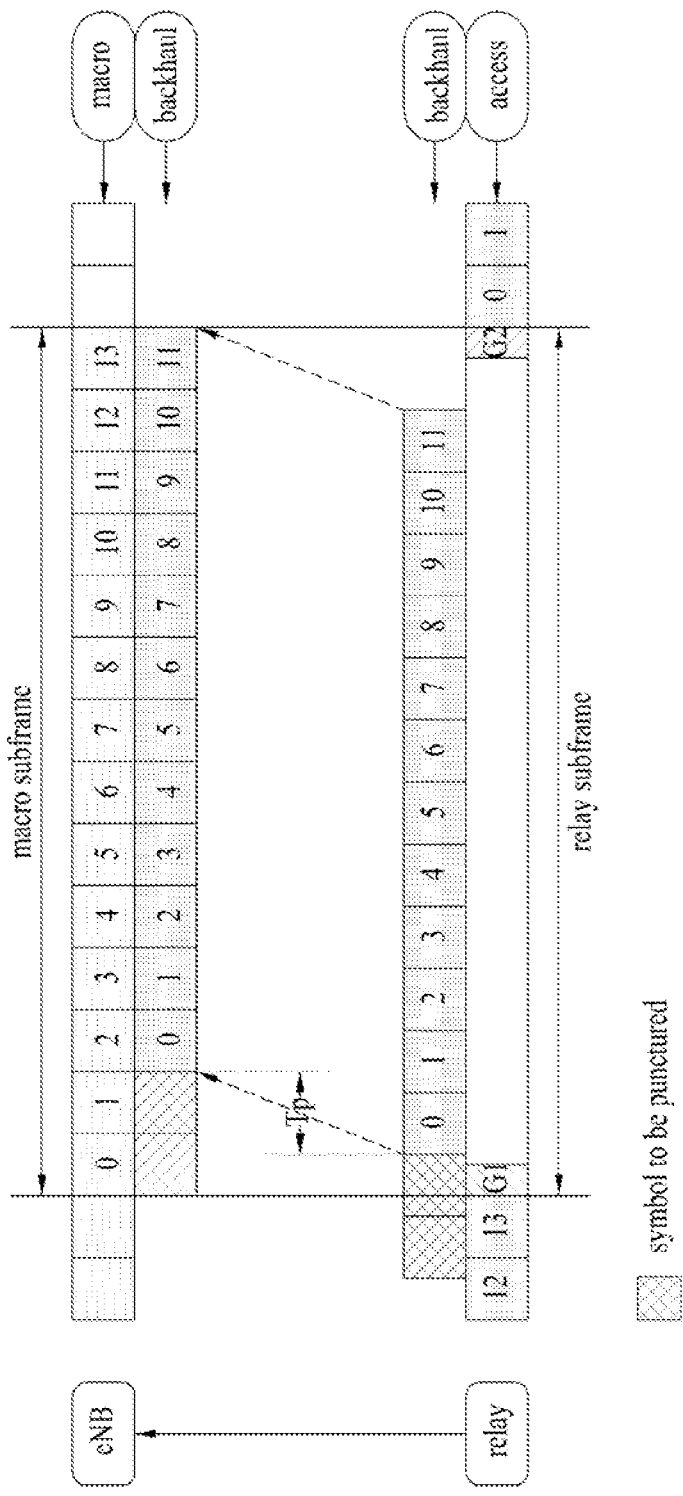
FIG. 16 is a further different diagram of an example of an uplink subframe transmission/reception timing.

The functioning blocks are not limited to the position depicted in FIG. 16 and may change its position depending on a case. For instance, the scrambling blocks 162/167 can be positioned after a channel interleaving block. And, the codeword to layer matching block 163 can be positioned after the channel interleaving block 168 or a modulation mapper block 169.

The present invention proposes a method of efficiently transmitting such UL control information as CQI, RI, and ACK/NACK according to a UL subframe transmission/reception timing between backhaul links or access links in an environment at which a macro eNode B (Macro eNB) and a relay node (RN) coexist.

Prior to the beginning of explanation of the present invention, the UL subframe transmission/reception timing between backhaul links or access links is briefly explained. For clarity of explanation, the present invention is explained based on LTE system. Yet, it will be apparent to those having ordinary skill in the technical field to which the present invention pertains that the present invention can be applied to a different type of UL subframe transmission/reception timing except the UL subframe transmission/reception timing described in the following description. In particular, assume that a subframe index starts from '0'.

A $1^{st}$ UL subframe transmission/reception timing corresponds to a case that a relay node starts backhaul UL transmission in a SC-FDMA symbol of index 'm' and ends the backhaul UL transmission in the SC-FDMA symbol of index 'n'.

A $2^{nd}$ UL subframe transmission/reception timing corresponds to a case that a relay node performs a backhaul UL transmission from a SC-FDMA symbol of index '0' to the last SC-FDMA symbol. In case of a normal CP, the index of the last SC-FDMA symbol is '13'. In particular, the $2^{nd}$ UL subframe transmission/reception timing corresponds to a case that a boundary between the backhaul link and an access link is mismatched as much as a preset space and transmission/reception switching time of a relay node is considered by a puncturing of the last SC-FDMA symbol of the access link or a guard period.

A $3^{rd}$ UL subframe transmission/reception timing corresponds to a case that a relay node performs a backhaul UL transmission from a SC-FDMA symbol of index '0' to the SC-FDMA symbol of index '12' or '13'. The index '12' or '13' can be determined based on propagation delay between a macro eNode B and a relay node and the transmission/reception switching time of a relay node. In particular, the $3^{rd}$ UL subframe transmission/reception timing corresponds to a case that a backhaul UL reception timing of a macro eNode B and an access UL reception timing of a relay node are matched with each other and a transmission/reception switching time of a relay node is considered by a puncturing of the last SC-FDMA symbol of an access link or a backhaul link.

Figure 14:
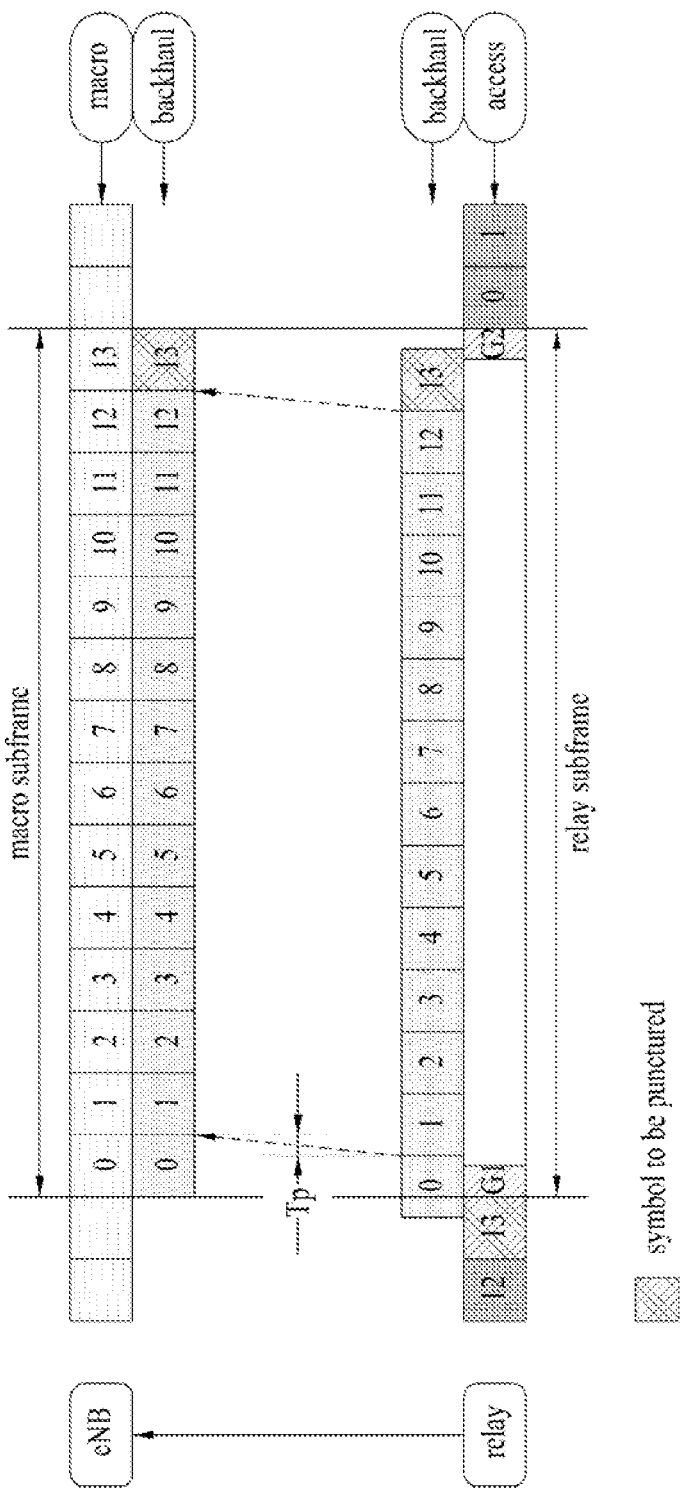
FIG. 14 is a diagram of an example of an uplink subframe transmission/reception timing.

FIG. 14 is a diagram of an example of an uplink subframe transmission/reception timing. In particular, FIG. 14 shows an example of the $3^{rd}$ UL subframe transmission/reception timing to which a normal CP is applied.

Referring to FIG. 14, Tp means propagation delay and G1 and G2 mean a guard period. In case that a length of a symbol corresponds to 'L', following conditions are satisfied. (Tp+G1<L), (Tp<G1), and (Tp+L>G2).

Referring to FIG. 14, it is able to know that a last symbol of a backhaul UL subframe, i.e., the symbol of index '13' and a last symbol of an access UL subframe, i.e., the symbol of index '13' are punctured.

In particular, the last symbol of the backhaul UL subframe is punctured by the time (G2) of switching from a transmitting mode to a receiving mode of a relay node.

And, in case that a transmission start point of the access UL subframe is timing advanced as much as 'Tp' to match a backhaul UL reception timing of a macro eNode B with an access UL reception timing of the relay node, the last symbol of the access UL subframe is punctured since the last symbol of the access UL subframe is overlapped with the symbol of the backhaul UL subframe, which has an index of '0'. And, the last symbol of the access UL subframe is punctured since a time (G1) of switching from a receiving mode to a transmitting mode of the relay node is required.

Figure 15:
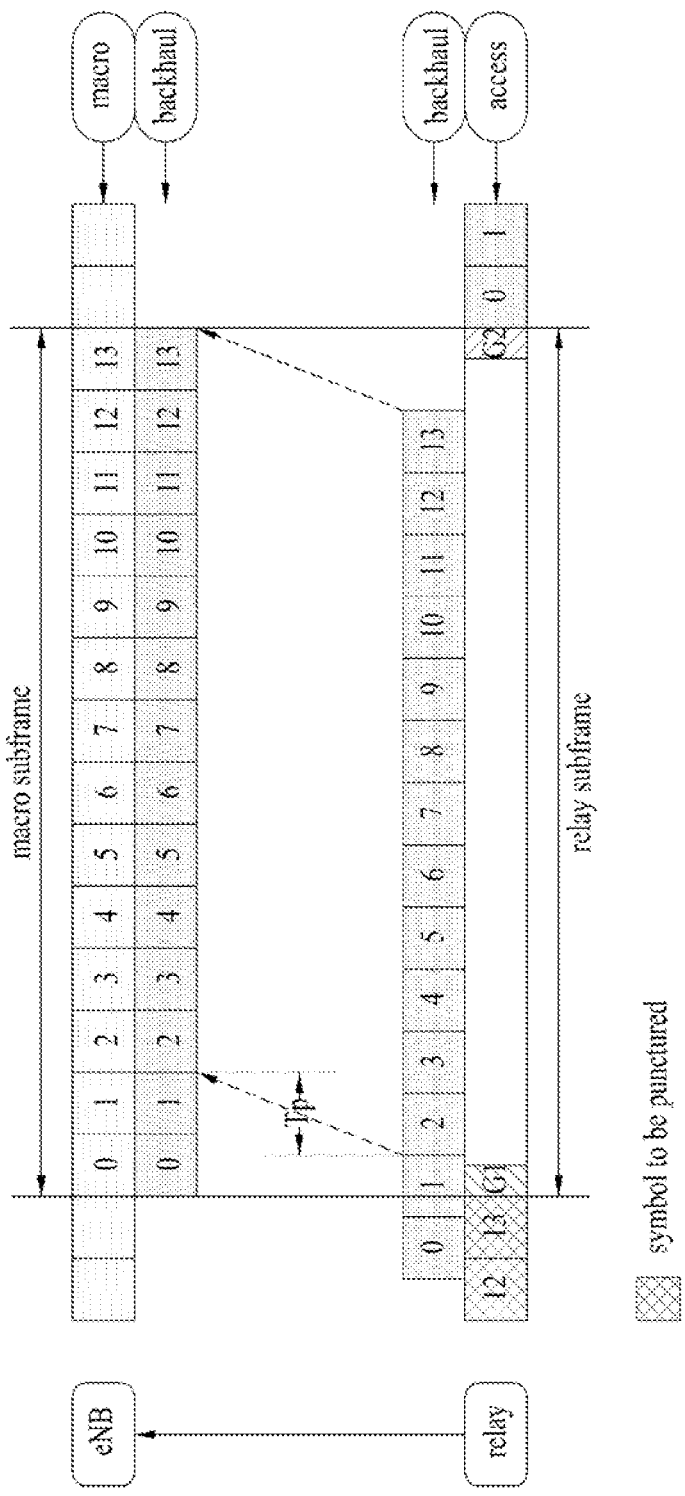
FIG. 15 is a different diagram of an example of an uplink subframe transmission/reception timing.

FIG. 15 is a different diagram of an example of an uplink subframe transmission/reception timing. Similar to FIG. 14, FIG. 15 shows an example of the $3^{rd}$ UL subframe transmission/reception timing to which a normal CP is applied.

If cell coverage of a macro eNode B is expanded, a maximum value of the Tp increases. In this case, a previous symbol of a last symbol of the access UL subframe, for instance, a symbol of index '12' in case of a normal CP or a symbol of index '10' in case of an extended CP can be punctured as well.

Referring to FIG. 15, it is able to aware that as a value of the Tp increases, a previous symbol of the last symbol of the access UL subframe, i.e., the symbol of index '12' is punctured as well as the last symbol of the access UL subframe.

And, if a subframe boundary of a backhaul link and that of an access link are perfectly synchronized or matched with each other in a TDD system or an FDD system like a CoMP joint transmission (JT) and an MBSFN operation, a situation that one or more symbols in an UL subframe of the backhaul link cannot be used for UL transmission as the Tp value increases may occur.

FIG. 16 is a further different diagram of an example of an uplink subframe transmission/reception timing.

Referring to FIG. 16, it is able to aware that symbols of index '12' and '13' of a backhaul UL subframe to which a normal CP is applied are punctured due to a propagation delay in a TDD system.

In this case, the reason why a relay node cannot transmit the symbols of index '12' and '13' of the backhaul UL subframe is because first two symbols deviates from the boundary of the backhaul UL subframe, which is configured in the TDD system, in a manner of timing advancing a transmission start point of the backhaul UL subframe as much as the Tp.

Figure 17:
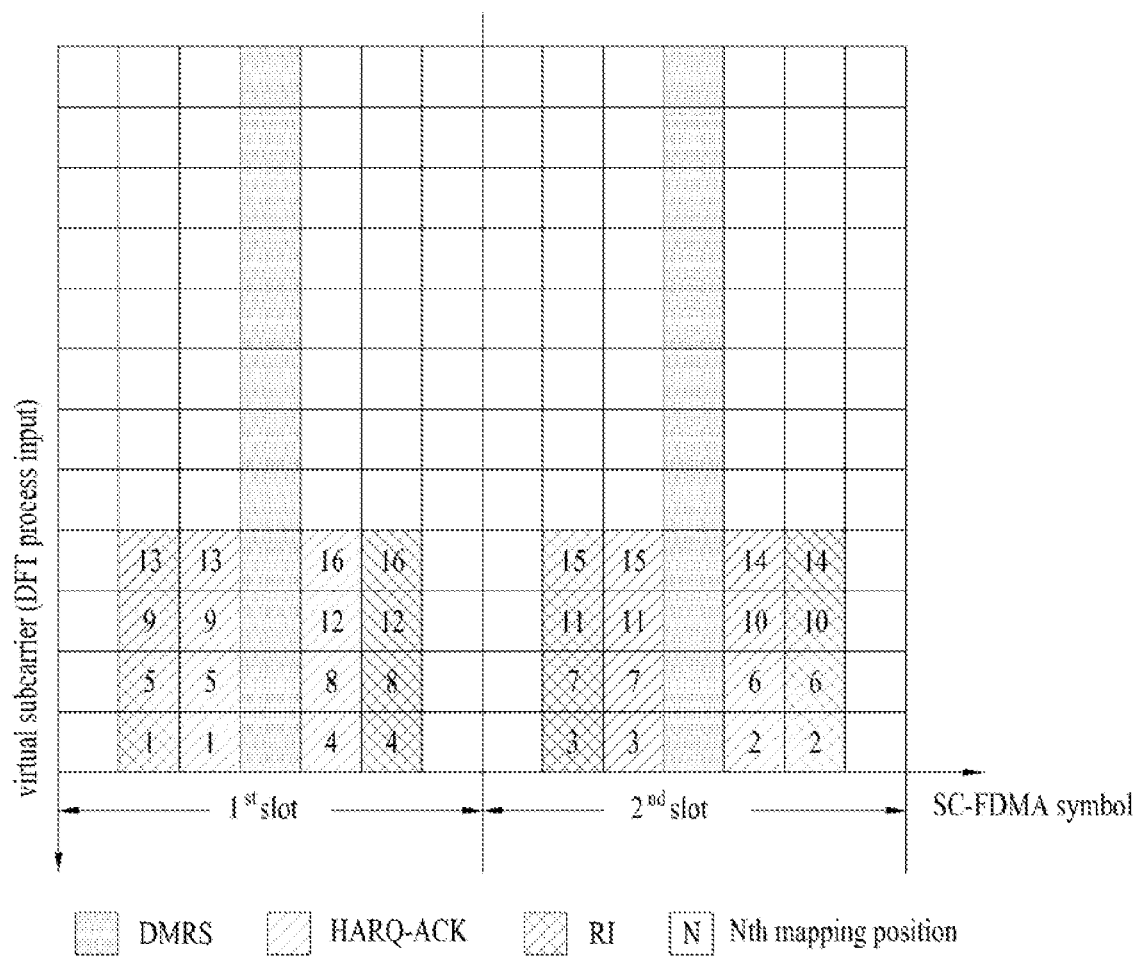
FIG. 17 is a diagram of a mapping sequence of control information in a LTE system in case that a normal CP is applied.
Figure 18:
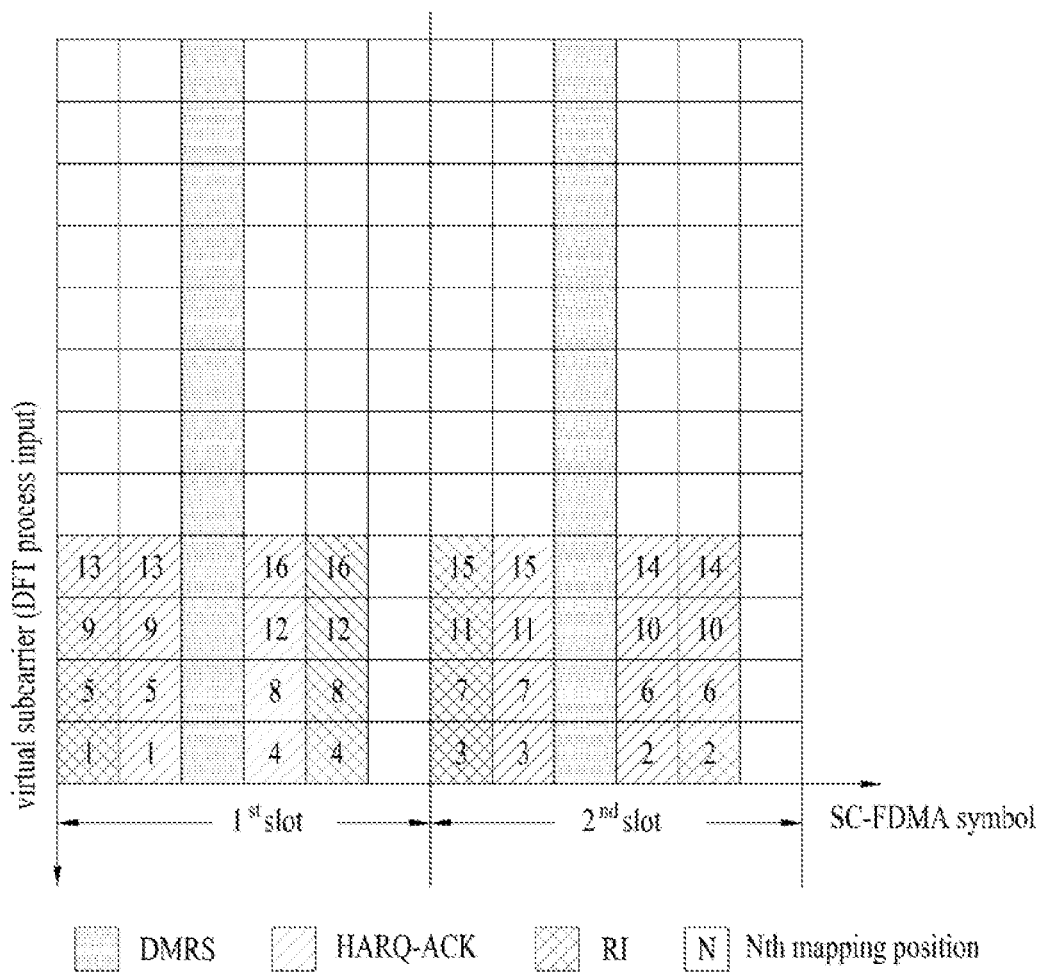
FIG. 18 is a diagram of a mapping sequence of control information in a LTE system in case that an extended CP is applied.

FIG. 17 is a diagram of a mapping sequence of control information in a LTE system in case that a normal CP is applied and FIG. 18 is a diagram of a mapping sequence of control information in a LTE system in case that an extended CP is applied. In particular, assume that the number of modulation symbol necessary for RI information mapping and the number of modulation symbol necessary for ACK/NACK information mapping identically corresponds to '16'.

Referring to FIG. 17, it is able to aware that the RI information is mapped to the symbol index 1, 5, 8, and 12 and the ACK/NACK information is mapped to the symbol index 1, 3, 7 and 9.

And, referring to FIG. 18, it is able to aware that the RI information is mapped to the symbol index 0, 4, 6, and 10 and the ACK/NACK information is mapped to the symbol index 1, 3, 7, and 9.

Yet, as mentioned in FIG. 15 and FIG. 16, in case that a previous symbol of a last symbol of the access/backhaul UL subframe as well as the last symbol of the access/backhaul UL subframe is punctured, a problem that the symbol to which the RI information is mapped, e.g., the symbol of index '12' in FIG. 17 or the symbol of index '10' in FIG. 18 is lost may occur.

Hence, in case that the aforementioned $3^{rd}$ UL subframe timing is applied, the present invention proposes a method of avoiding a loss of control information, which may be occurred by puncturing a part of symbols of a UL subframe. Moreover, the present invention can be extensively applied to such various cases as a part of symbols of a UL subframe are punctured or cannot be used as well as a situation to which the $3^{rd}$ UL subframe timing is applied.

For clarity, although the method of avoiding a loss of control information is described based on 3GPP LTE system in the following description, it is apparent that the method can be extended to a different communication system and can be applied to a control information transmission between a macro eNode B and a relay node, between a relay node and a user equipment, and between a macro eNode B and a user equipment.

<$1^{st}$ Embodiment>

A $1^{st}$ embodiment of the present invention proposes that a symbol index to which an RI information is mapped on PUSCH is limited to a symbol index 5 and 8 in case of a normal CP and a symbol index 4 and 6 in case of an extended CP. In this case, the maximum number of (modulation) symbol is limited to $2 \times M_{sc}^{PUSCH}$. $M_{sc}^{PUSCH}$ corresponds to a bandwidth scheduled for PUSCH transmission of a transport block in a current subframe and can be represented as the number of subcarrier.

Figure 19:
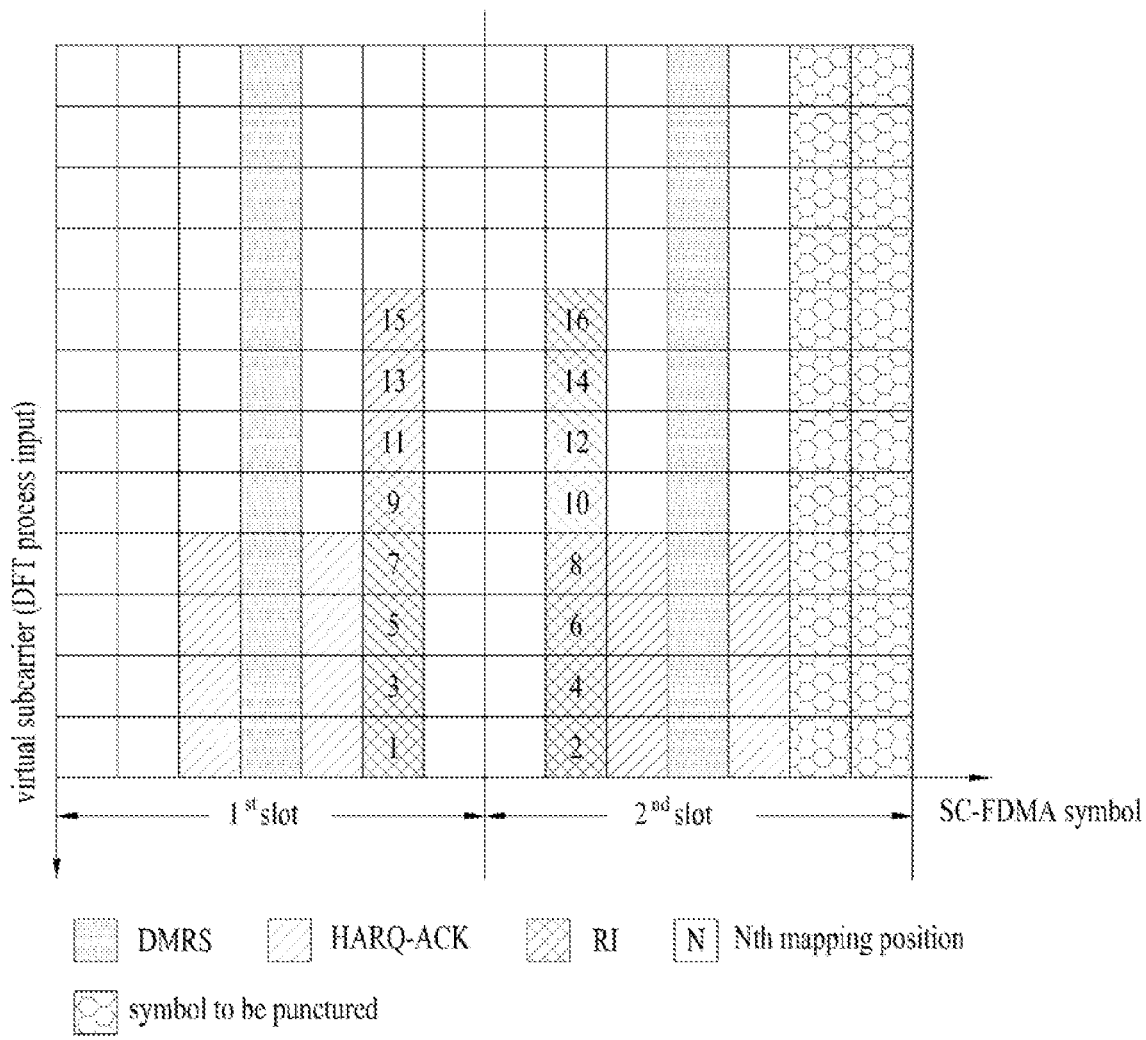
FIG. 19 is a diagram for an example of mapping a control information according to a $1^{st}$ embodiment of the present invention in case that a normal CP is applied.
Figure 20:
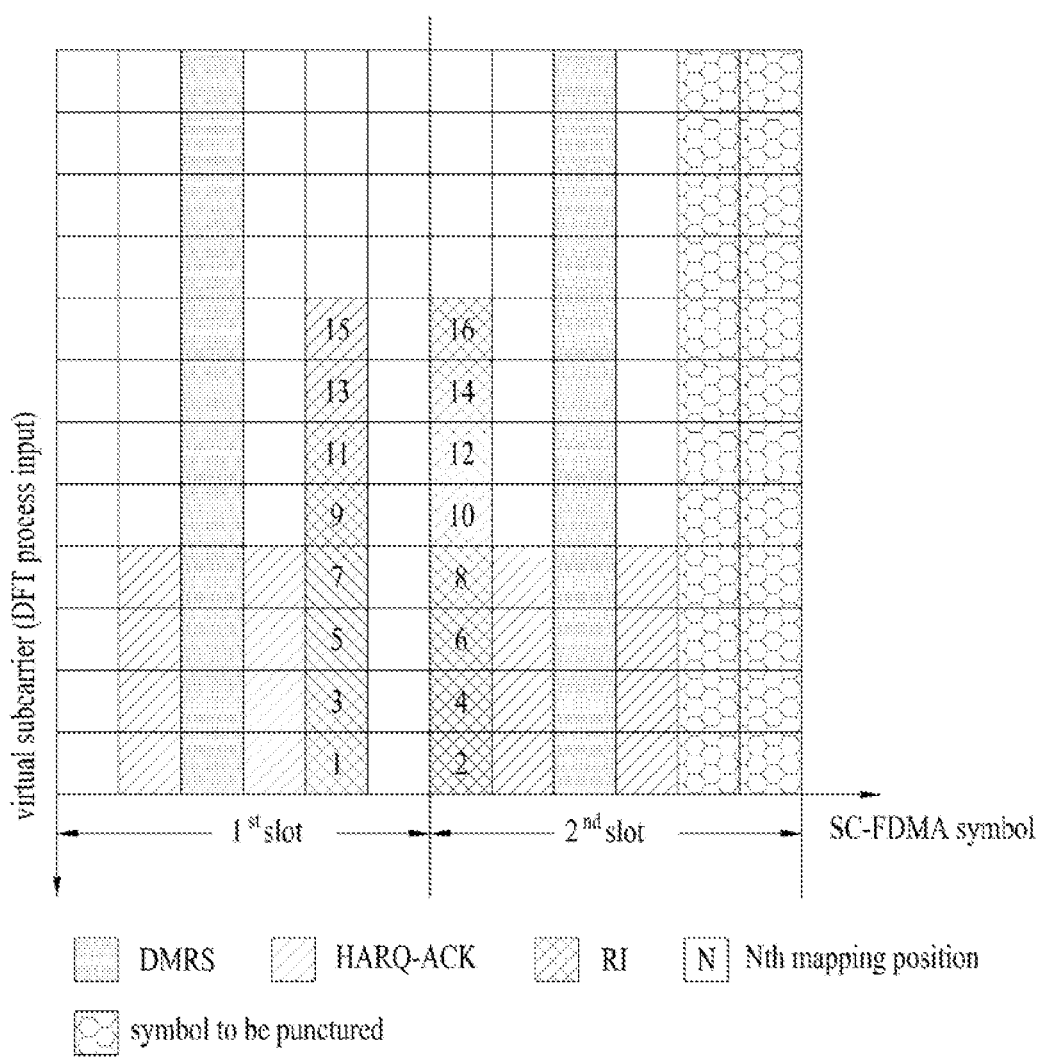
FIG. 20 is a diagram for an example of mapping a control information according to a $1^{st}$ embodiment of the present invention in case that an extended CP is applied.

FIG. 19 is a diagram for an example of mapping a control information according to a 1$^{st}$ embodiment of the present invention in case that a normal CP is applied and FIG. 20 is a diagram for an example of mapping a control information according to a 1$^{st}$ embodiment of the present invention in case that an extended CP is applied. Assume that the number of modulation symbol necessary for an RI information in FIG. 19 and FIG. 20 corresponds to '16'.

<2$^{nd}$ Embodiment>

A 2$^{nd}$ embodiment of the present invention proposes that a symbol index to which an RI information is mapped on PUSCH is limited to a symbol index 1, 5 and 8 in case of a normal CP and a symbol index 0, 4 and 6 in case of an extended CP. In this case, the maximum number of (modulation) symbol is limited to $3 \times M_{sc}^{PUSCH}$.

Figure 21:
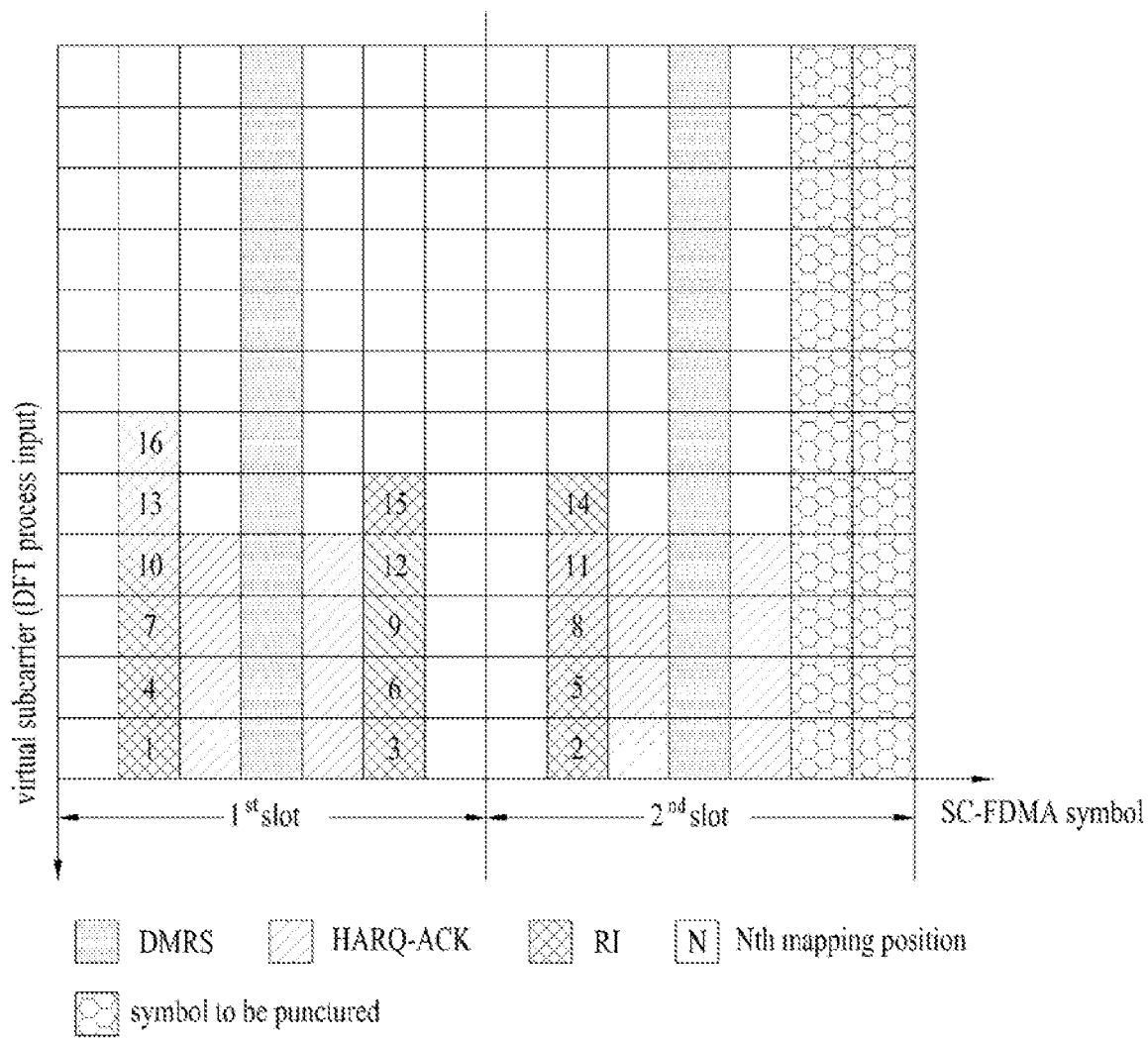
FIG. 21 is a diagram for an example of mapping a control information according to a $2^{nd}$ embodiment of the present invention in case that a normal CP is applied.
Figure 22:
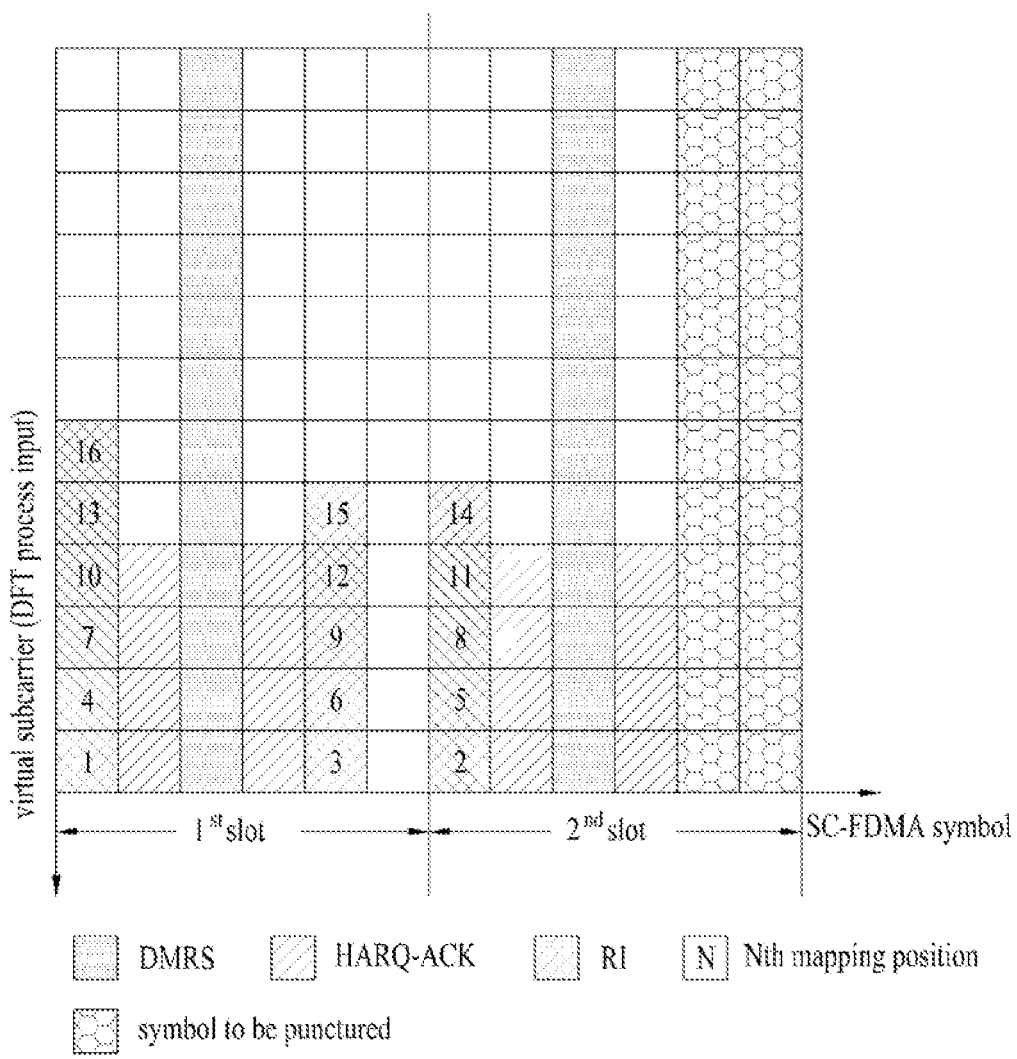
FIG. 22 is a diagram for an example of mapping a control information according to a $2^{nd}$ embodiment of the present invention in case that an extended CP is applied.

FIG. 21 is a diagram for an example of mapping a control information according to a 2$^{nd}$ embodiment of the present invention in case that a normal CP is applied and FIG. 22 is a diagram for an example of mapping a control information according to a 2$^{nd}$ embodiment of the present invention in case that an extended CP is applied. Assume that the number of modulation symbol necessary for an RI information in FIG. 21 and FIG. 22 corresponds to '16'.

Figure 23:
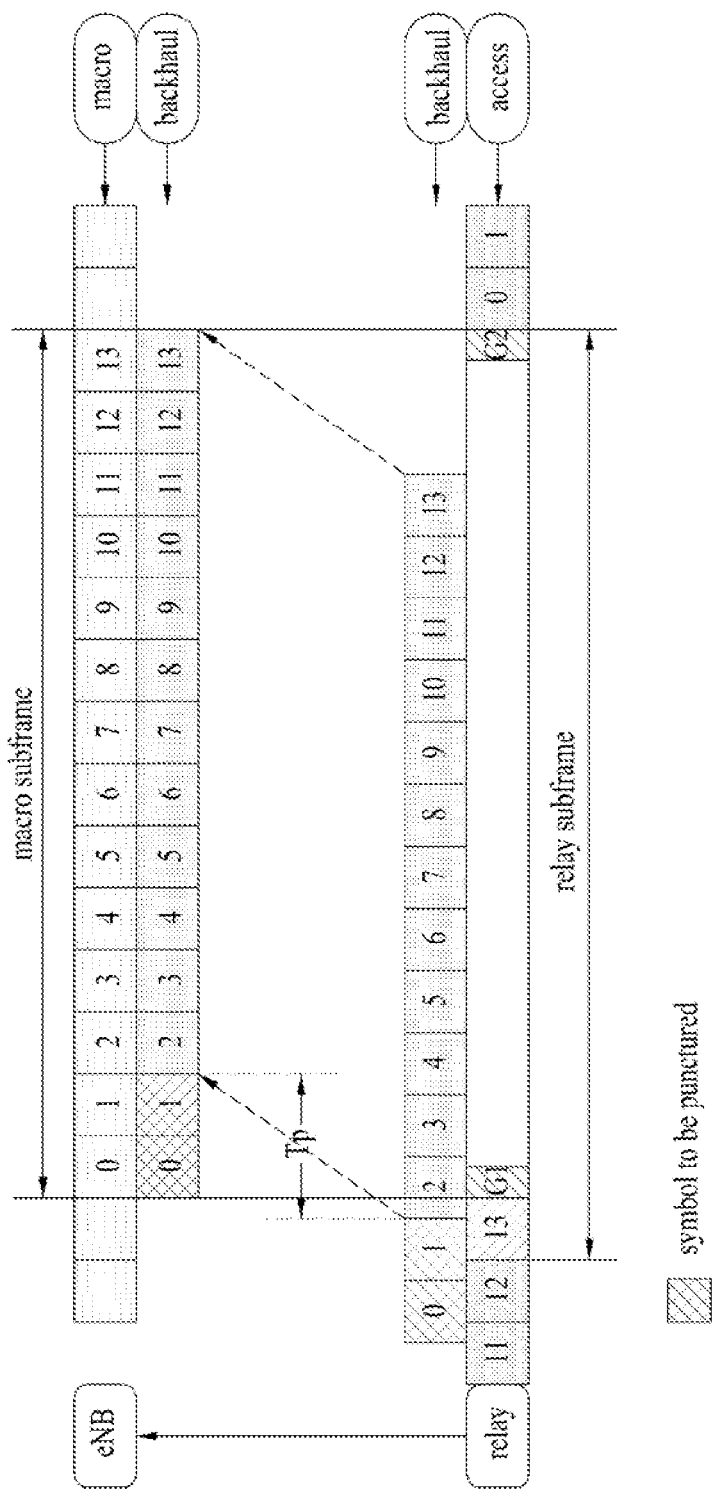
FIG. 23 is a diagram of an uplink subframe transmission/reception timing to which an embodiment of the present invention is applicable.

FIG. 23 is a diagram of an uplink subframe transmission/reception timing to which an embodiment of the present invention is applicable. Similarly, FIG. 23 also assumes a case to which the aforementioned 3$^{rd}$ UL subframe timing is applied.

Referring to FIG. 23, it is able to aware that a 1$^{st}$ and 2$^{nd}$ symbol of a backhaul UL subframe are punctured. In particular, FIG. 23 corresponds to a case that a transmission start point of the backhaul UL subframe is timing advanced as much as Tp to match a UL subframe reception timing of a macro eNode B with a UL subframe reception timing of a relay node. The 1$^{st}$ and the 2$^{nd}$ symbol of the backhaul UL subframe are punctured in a manner of being overlapped with symbols of index '11' and '12' of an access UL subframe.

And, a last symbol of index '13' of the access UL subframe is punctured by not only the time (G1) of switching from a receiving mode to a transmitting mode of a relay node but also an overlapping with a symbol of index '2' of a backhaul UL subframe due to an advanced timing, i.e., Tp.

As shown in FIG. 23, if a 1$^{st}$ and 2$^{nd}$ symbol of the backhaul UL subframe are punctured, it may cause a loss of the RI information if a normal CP is applied. And, it may cause a loss of the RI and ACK/NACK information if an extended CP is applied.

In this case, the RI information can be mapped according to the 1st embodiment. Moreover, the RI information can be mapped according to a following 3rd embodiment.

And, if an extended CP is applied, ACK/NACK information can be mapped according to a 4$^{th}$ and 5$^{th}$ embodiment in the following description.

<3$^{rd}$ Embodiment>

A 3$^{rd}$ embodiment of the present invention proposes that a symbol index to which an RI information is mapped on PUSCH is limited to a symbol index 5, 8 and 12 in case of a normal CP and a symbol index 4, 6 and 10 in case of an extended CP. In this case, the maximum number of (modulation) symbol is limited to $3 \times M_{sc}^{PUSCH}$.

Figure 24:
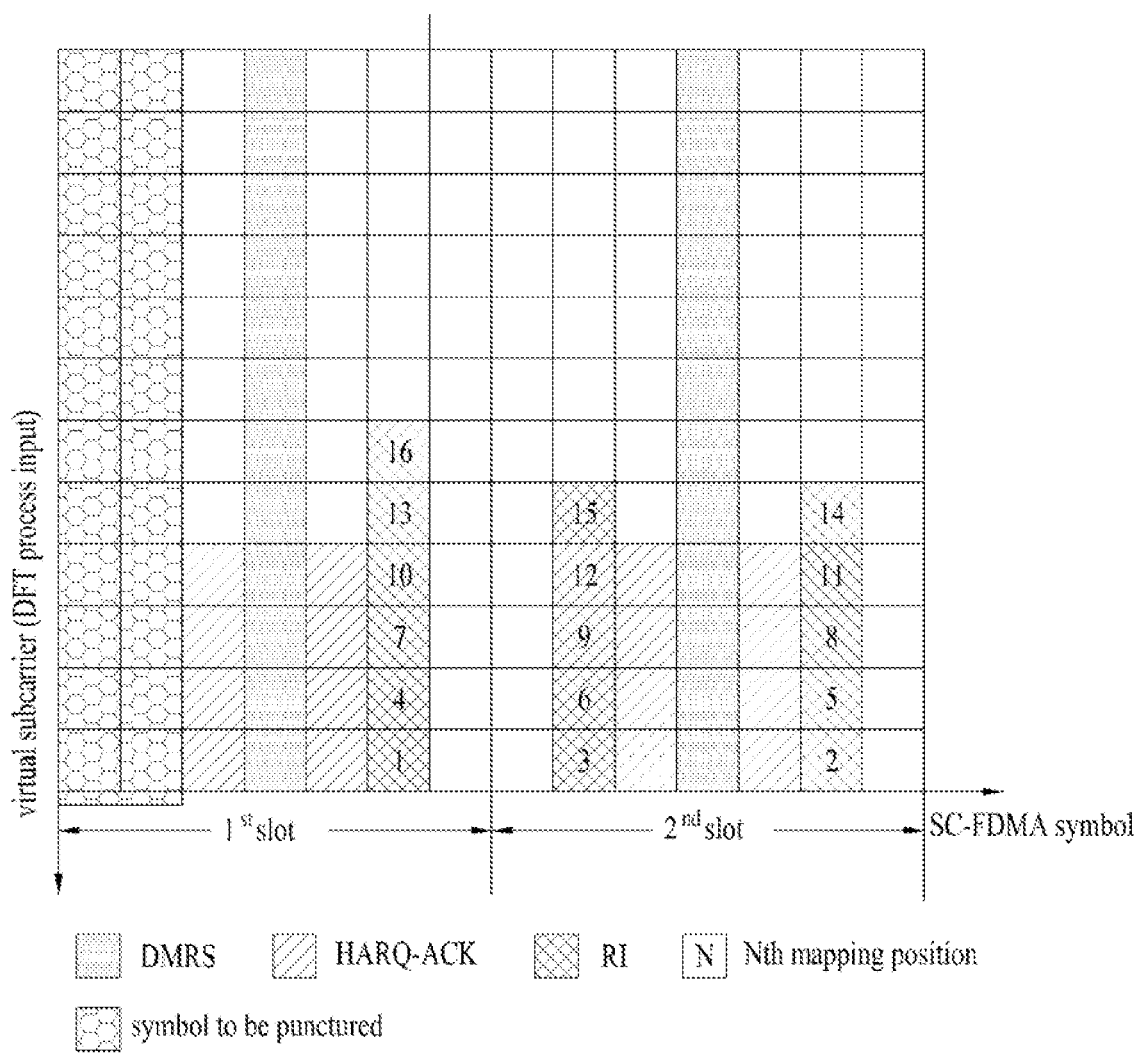
FIG. 24 is a diagram for an example of mapping a control information according to a $3^{rd}$ embodiment of the present invention in case that a normal CP is applied.
Figure 25:
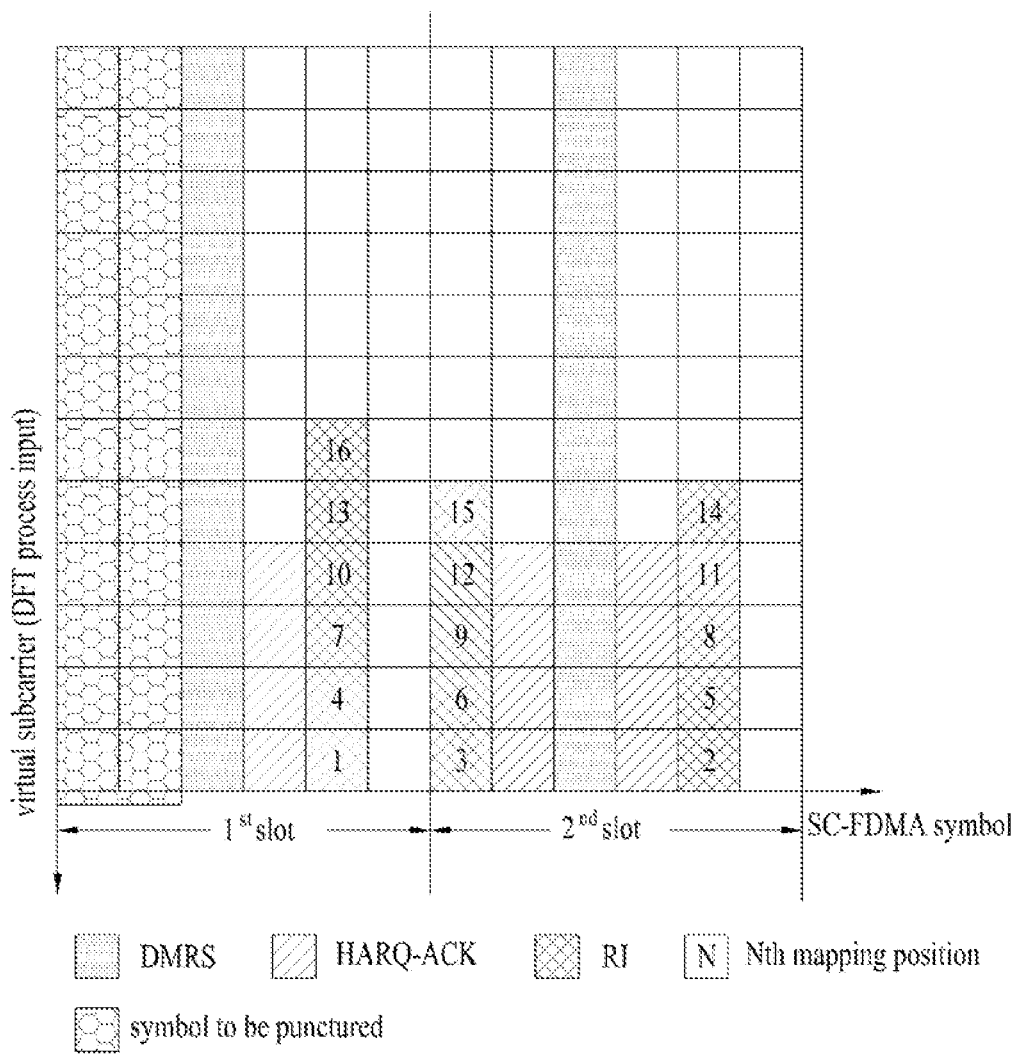
FIG. 25 is a diagram for an example of mapping a control information according to a $3^{rd}$ embodiment of the present invention in case that an extended CP is applied.

FIG. 24 is a diagram for an example of mapping a control information according to a 3$^{rd}$ embodiment of the present invention in case that a normal CP is applied and FIG. 25 is a diagram for an example of mapping a control information according to a 3$^{rd}$ embodiment of the present invention in case that an extended CP is applied. Assume that the number of modulation symbol necessary for an RI information in FIG. 24 and FIG. 25 corresponds to '16'.

<4$^{th}$ Embodiment>

A 4$^{th}$ embodiment of the present invention proposes that a symbol index to which an ACK/NACK information is mapped on PUSCH is limited to a symbol index 3 and 7 in case that an extended CP is applied in a subframe. In this case, the maximum number of (modulation) symbol is limited to $2 \times M_{sc}^{PUSCH}$.

Figure 26:
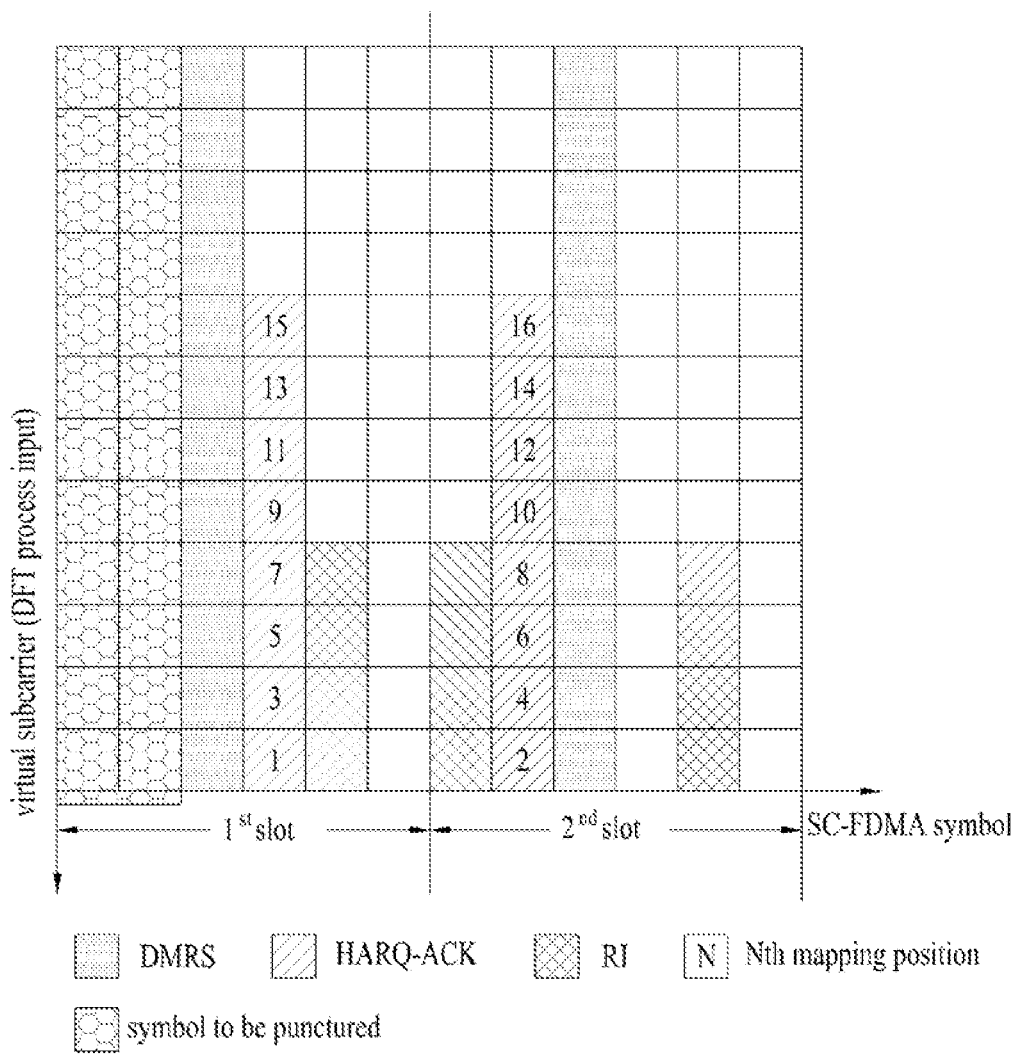
FIG. 26 is a diagram for an example of mapping a control information according to a $4^{th}$ embodiment of the present invention in case that an extended CP is applied.

FIG. 26 is a diagram for an example of mapping a control information according to a 4$^{th}$ embodiment of the present invention in case that an extended CP is applied. Assume that the number of modulation symbol necessary for an ACK/NACK information corresponds to '16'.

<5$^{th}$ Embodiment>

A 5$^{th}$ embodiment of the present invention proposes that a symbol index to which an ACK/NACK information is mapped on PUSCH is limited to a symbol index 3, 7 and 9 in case that an extended CP is applied in a subframe. In this case, the maximum number of (modulation) symbol is limited to $3 \times M_{sc}^{PUSCH}$.

Figure 27:
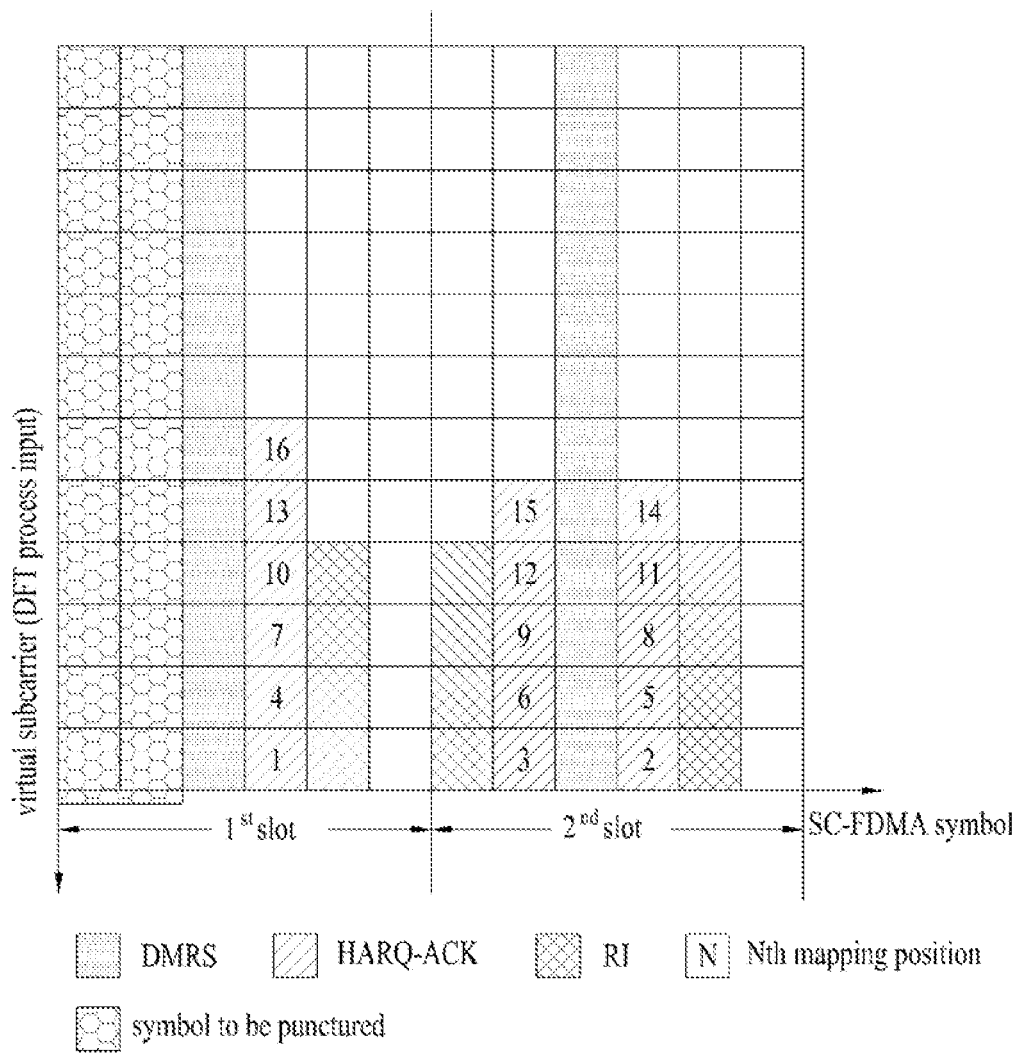
FIG. 27 is a diagram for an example of mapping a control information according to a $5^{th}$ embodiment of the present invention in case that an extended CP is applied.

FIG. 27 is a diagram for an example of mapping a control information according to a 5$^{th}$ embodiment of the present invention in case that an extended CP is applied. Assume that the number of modulation symbol necessary for an ACK/NACK information corresponds to '16'.

The aforementioned embodiments can be applied not only a case that UL control information is multiplexed together with a UL data but also a case that the UL control information is independently transmitted without being multiplexed together with the UL data. Although the embodiments describes on the RI and the ACK/NACK information, it is apparent that the embodiments can be applied to a case of mapping CQI/PMI on PUSCH as well.

Figure 28:
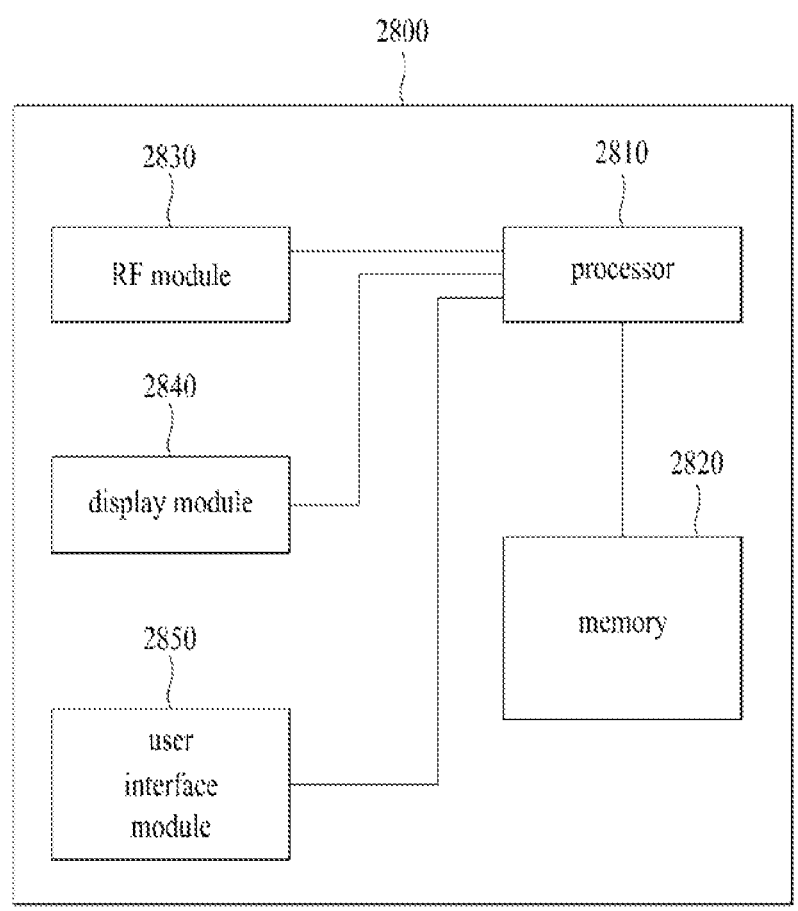
FIG. 28 is a block diagram of an example for a communication device according to one embodiment of the present invention.

FIG. 28 is a block diagram of an example for a communication device according to one embodiment of the present invention.

Referring to FIG. 28, a communication device 2800 may include a processor 2810, a memory 2820, an RF module 2830, a display module 2840, and a user interface module 2850.

Since the communication device 2800 is depicted for clarity of description, prescribed module(s) may be omitted in part. The communication device 2800 may further include necessary module(s). And, a prescribed module of the communication device 2800 may be divided into subdivided modules. A processor 2810 is configured to perform an operation according to the embodiments of the present invention illustrated with reference to drawings. In particular, the detailed operation of the processor 2810 may refer to the former contents described with reference to FIG. 1 to FIG. 27.

The memory 2820 is connected with the processor 2810 and stores an operating system, applications, program codes, data, and the like. The RF module 2830 is connected with the processor 2810 and then performs a function of converting a baseband signal to a radio signal or a function of converting a radio signal to a baseband signal. To this end, the RF module 2830 performs an analog conversion, amplification, a filtering, and a frequency up conversion, or performs processes inverse to the former processes. The display module 2840 is connected with the processor 2810 and displays various kinds of informations. And, the display module 2840 can be implemented using such a well-known component as an LCD (liquid crystal display), an LED (light emitting diode), an OLED (organic light emitting diode) display and the like, by which the present invention may be non-limited. The user interface module 2850 is connected with the processor 2810 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a relay node and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a UE can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a method of transmitting UL control information in a wireless communication system and apparatus therefor are described with reference to examples applied to 3GPP LTE system, it may be applicable to various kinds of wireless communication systems as well as to the 3GPP LTE system.

What is claimed is:

1. A method of allocating a resource, which is allocated by a relay node to transmit an uplink control information to an eNode B in a wireless communication system, comprising the steps of:
   generating a control information sequence for a backhaul downlink between the relay node and the eNode B;
   if a plurality of symbols are punctured in a front end or a rear end of a backhaul uplink subframe between the relay node and the eNode B, setting symbols for mapping the control information sequence; and
   performing a time-first mapping for the control information sequence to resource elements corresponding to the set symbols in descending order of a subcarrier index.

2. The method of claim 1, wherein if a plurality of the symbols are punctured in the rear end of the backhaul uplink subframe to which a normal cyclic prefix is applied, the symbols for mapping the control information sequence are set to an index 5 and 8.

3. The method of claim 1, wherein if a plurality of the symbols are punctured in the rear end of the backhaul uplink subframe to which a normal cyclic prefix is applied, the symbols for mapping the control information sequence are set to an index 1, 5, and 8.

4. The method of claim 1, wherein if a plurality of the symbols are punctured in the front end of the backhaul uplink subframe to which a normal cyclic prefix is applied, the symbols for mapping the control information sequence are set to an index 5, 8, and 12.

5. The method of claim 1, wherein the control information sequence for the backhaul downlink corresponds to a rank indicator.

6. The method of claim 1, wherein if a plurality of the symbols are punctured in the front end of the backhaul uplink subframe to which an extended cyclic prefix is applied, the symbols for mapping the control information sequence are set to an index 3 and 7.

7. The method of claim 1, wherein if a plurality of the symbols are punctured in the front end of the backhaul uplink subframe to which an extended cyclic prefix is applied, the symbols for mapping the control information sequence are set to an index 3, 7, and 9.

8. The method of claim 1, wherein the control information sequence for the backhaul downlink corresponds to an ACK/NACK (Acknowledgement/Negative ACK) information.

9. A relay node in a wireless communication system, comprising:
   a processor configured to generate a control information sequence for a backhaul downlink between the relay node and an eNode B, if a plurality of symbols are punctured in a front end or a rear end of a backhaul uplink subframe between the relay node and the eNode B, the processor configured to set symbols for mapping the control information sequence, the processor configured to perform a time-first mapping for the control information sequence to resource elements corresponding to the set symbols in descending order of a subcarrier index; and
   a transmission module configured to transmit the mapped control information sequence to the eNode B.

10. The relay node of claim 9, wherein if a plurality of the symbols are punctured in the rear end of the backhaul uplink subframe to which a normal cyclic prefix is applied, the processor is configured to set the symbols for mapping the control information sequence to an index 5 and 8.

11. The relay node of claim 9, wherein if a plurality of the symbols are punctured in the rear end of the backhaul uplink subframe to which a normal cyclic prefix is applied, the processor is configured to set the symbols for mapping the control information sequence to an index 1, 5, and 8.

12. The relay node of claim 9, wherein if a plurality of the symbols are punctured in the front end of the backhaul uplink subframe to which a normal cyclic prefix is applied, the processor is configured to set the symbols for mapping the control information sequence to an index 5, 8, and 12.

13. The relay node of claim 9, wherein the control information sequence for the backhaul downlink comprises a rank indicator.

14. The relay node of claim 9, wherein if a plurality of the symbols are punctured in the front end of the backhaul uplink subframe to which an extended cyclic prefix is applied, the processor is configured to set the symbols for mapping the control information sequence to an index 3 and 7.

15. The relay node of claim 9, wherein if a plurality of the symbols are punctured in the front end of the backhaul uplink subframe to which an extended cyclic prefix is applied, the processor is configured to set the symbols for mapping the control information sequence to an index 3, 7, and 9.

16. The relay node of claim 9, wherein the control information sequence for the backhaul downlink comprises an ACK/NACK (Acknowledgement/Negative ACK) information.

* * * * *